(12) United States Patent
Unterreiner et al.

(10) Patent No.: US 11,167,468 B2
(45) Date of Patent: Nov. 9, 2021

(54) STRETCHING SYSTEM

(71) Applicant: Brückner Maschinenbau GmbH & Co. KG, Siegsdorf (DE)

(72) Inventors: Markus Unterreiner, Marquartstein (DE); Michael Bauer, Amerang (DE); Anthimos Giapoulis, Traunstein (DE); Thomas Rott, Siegsdorf (DE); Oliver Jung, Radevormwald (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 510 days.

(21) Appl. No.: 16/050,287

(22) Filed: Jul. 31, 2018

(65) Prior Publication Data
US 2019/0039282 A1    Feb. 7, 2019

(30) Foreign Application Priority Data
Aug. 1, 2017  (DE) ............... 10 2017 117 420.6

(51) Int. Cl.
| B29C 55/20 | (2006.01) |
| B29C 55/08 | (2006.01) |
| B29C 55/16 | (2006.01) |
| B65H 23/028 | (2006.01) |
| B65H 20/16 | (2006.01) |

(52) U.S. Cl.
CPC .............. *B29C 55/20* (2013.01); *B29C 55/08* (2013.01); *B29C 55/165* (2013.01); *B65H 20/16* (2013.01); *B65H 23/028* (2013.01)

(58) Field of Classification Search
CPC ....... B29C 55/08; B29C 55/20; B29C 55/165; B65H 20/16; B65H 23/028; B29D 7/01; B29L 2007/00

USPC ........................................................ 26/93
See application file for complete search history.

(56) References Cited

U.S. PATENT DOCUMENTS

| 2,285,820 A | * | 6/1942 | MacKnight | .............. D06C 3/00 |
| | | | | 26/93 |
| 3,457,608 A | * | 7/1969 | Gageur | ................. D06C 3/023 |
| | | | | 26/93 |
| 3,638,289 A | * | 2/1972 | Dornier | ................. D06C 3/023 |
| | | | | 26/93 |
| 4,602,407 A | * | 7/1986 | Gresens | ............... B29C 55/165 |
| | | | | 26/89 |

(Continued)

FOREIGN PATENT DOCUMENTS

| CN | 102395457 | 3/2012 |
| CN | 103180122 | 6/2013 |

(Continued)

OTHER PUBLICATIONS

Search Report issued in TW Appln. No. 107126437 dated Nov. 30, 2018.

(Continued)

*Primary Examiner* — Anne M Kozak
(74) *Attorney, Agent, or Firm* — Nixon & Vanderhye P.C.

(57) ABSTRACT

An improved stretching system has the possibility of reducing the distance between two successive guide clips, for example. In technical terms, this is solved by using control clips. For example, a control clip can be provided between two successive guide clips and causes the distance between two successive guide clips to be altered by way of a lateral position adjustment by means of a control rail.

20 Claims, 24 Drawing Sheets

(56) References Cited

U.S. PATENT DOCUMENTS

| | | | | |
|---|---|---|---|---|
| 4,674,159 | A * | 6/1987 | Sclater | B29C 55/20 26/93 |
| 4,736,498 | A * | 4/1988 | Langer | D06C 3/04 26/91 |
| 4,815,181 | A | 3/1989 | Dornier et al. | |
| 4,882,820 | A * | 11/1989 | MacKinnon | D06C 3/023 26/93 |
| 4,926,529 | A * | 5/1990 | Hosmer | B21L 9/02 26/89 |
| 5,067,214 | A * | 11/1991 | Hosmer | F16G 13/06 26/89 |
| 5,161,674 | A * | 11/1992 | Rutz | B29C 55/165 198/812 |
| 5,367,753 | A * | 11/1994 | Mueller | B29C 55/165 26/73 |
| 5,390,398 | A * | 2/1995 | Rutz | B29C 55/165 26/72 |
| 5,402,556 | A | 4/1995 | Rutz | |
| 5,797,172 | A * | 8/1998 | Hosmer | D06C 3/025 26/89 |
| 5,970,589 | A * | 10/1999 | Hayashi | B29C 55/165 26/73 |
| 6,893,159 | B1 * | 5/2005 | Hosmer | B23P 15/003 384/280 |
| 9,073,257 | B2 | 7/2015 | Sano et al. | |
| 9,102,094 | B2 * | 8/2015 | Sano | B29C 55/165 |
| 9,381,696 | B2 * | 7/2016 | Baumeister | B29C 55/08 |
| 9,561,616 | B2 * | 2/2017 | Baumeister | B29C 55/12 |

FOREIGN PATENT DOCUMENTS

| | | |
|---|---|---|
| CN | 103687714 | 3/2014 |
| CN | 203543104 | 4/2014 |
| CN | 104162979 | 11/2014 |
| CN | 104884235 | 9/2015 |
| CN | 105008110 | 10/2015 |
| DE | 42 41 213 | 6/1994 |
| DE | 10 2008 059 548 | 6/2009 |
| DE | 10 2008 021 506 | 11/2009 |
| EP | 0 291 775 | 12/1993 |
| EP | 1 010 514 | 3/2006 |
| EP | 2 570 253 | 5/2014 |
| EP | 2 629 959 | 10/2014 |
| EP | 2 629 960 | 10/2014 |
| GB | 2 238 748 | 6/1991 |
| JP | 62-264151 | 11/1987 |
| JP | 2005-335324 | 12/2005 |
| JP | 60-17109 | 10/2016 |
| TW | 201109156 | 3/2011 |
| WO | WO 2014/094803 | 6/2014 |

OTHER PUBLICATIONS

Search Report issued in CN Appln. No. 2018108643498 dated May 26, 2020.

* cited by examiner

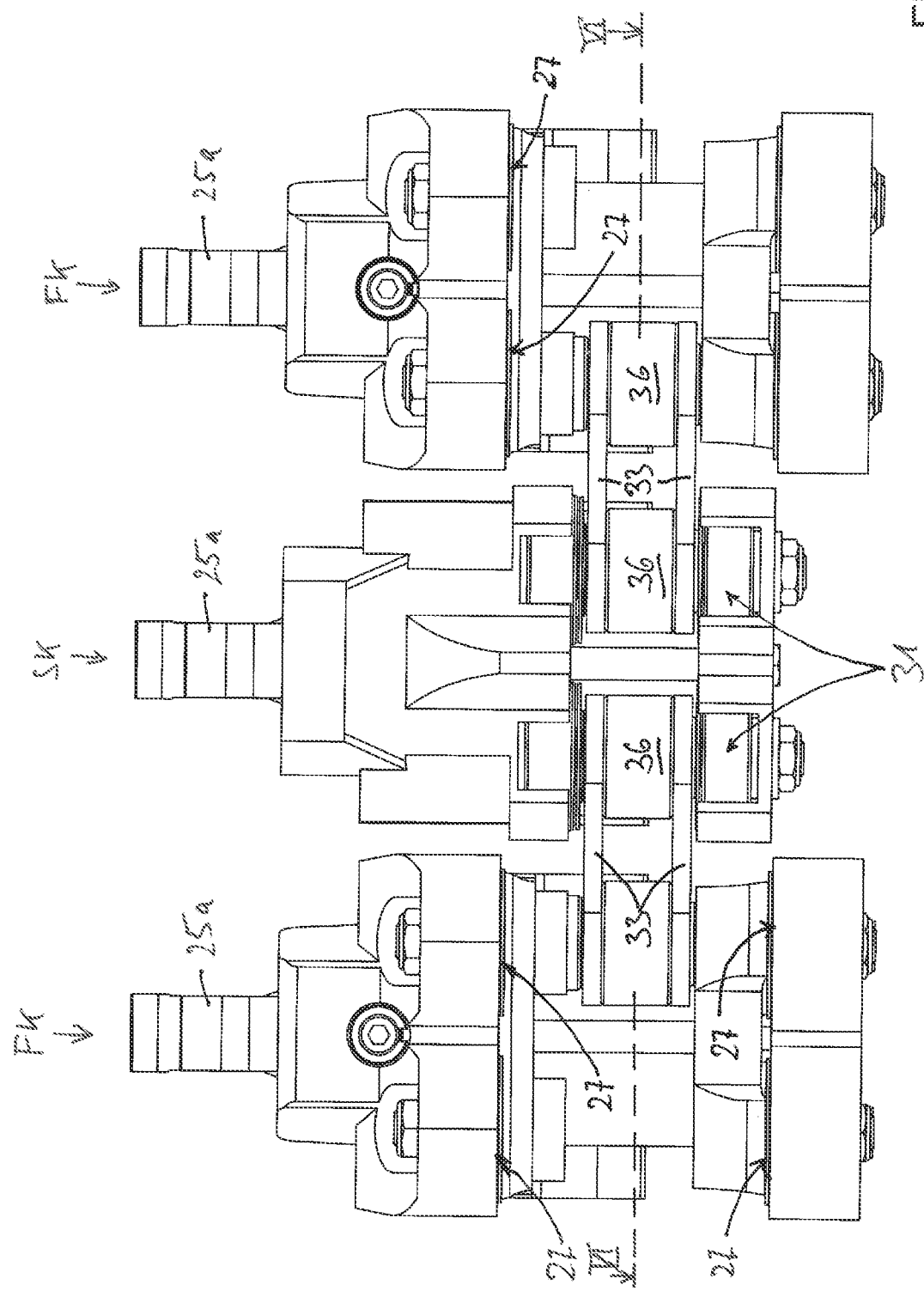

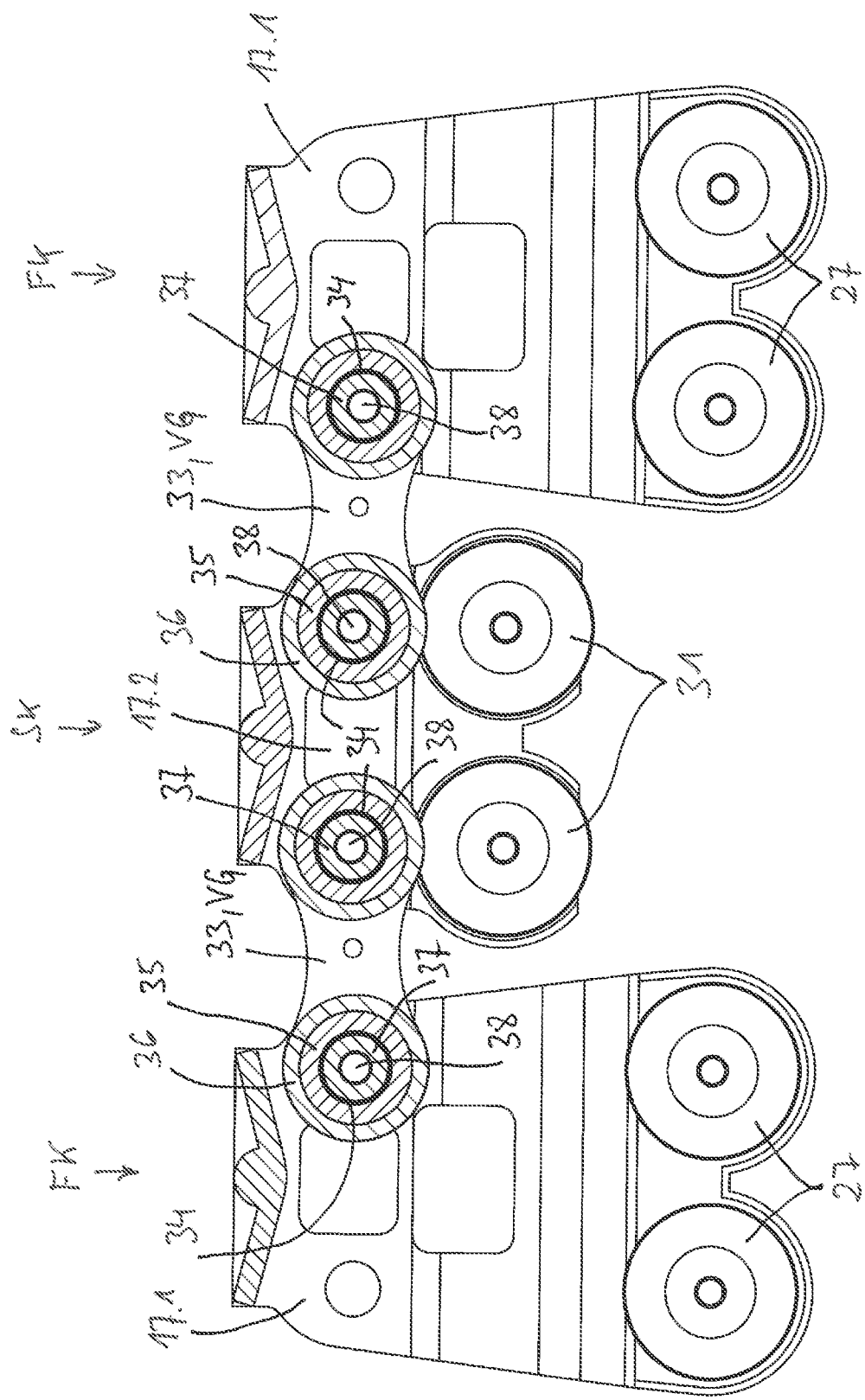

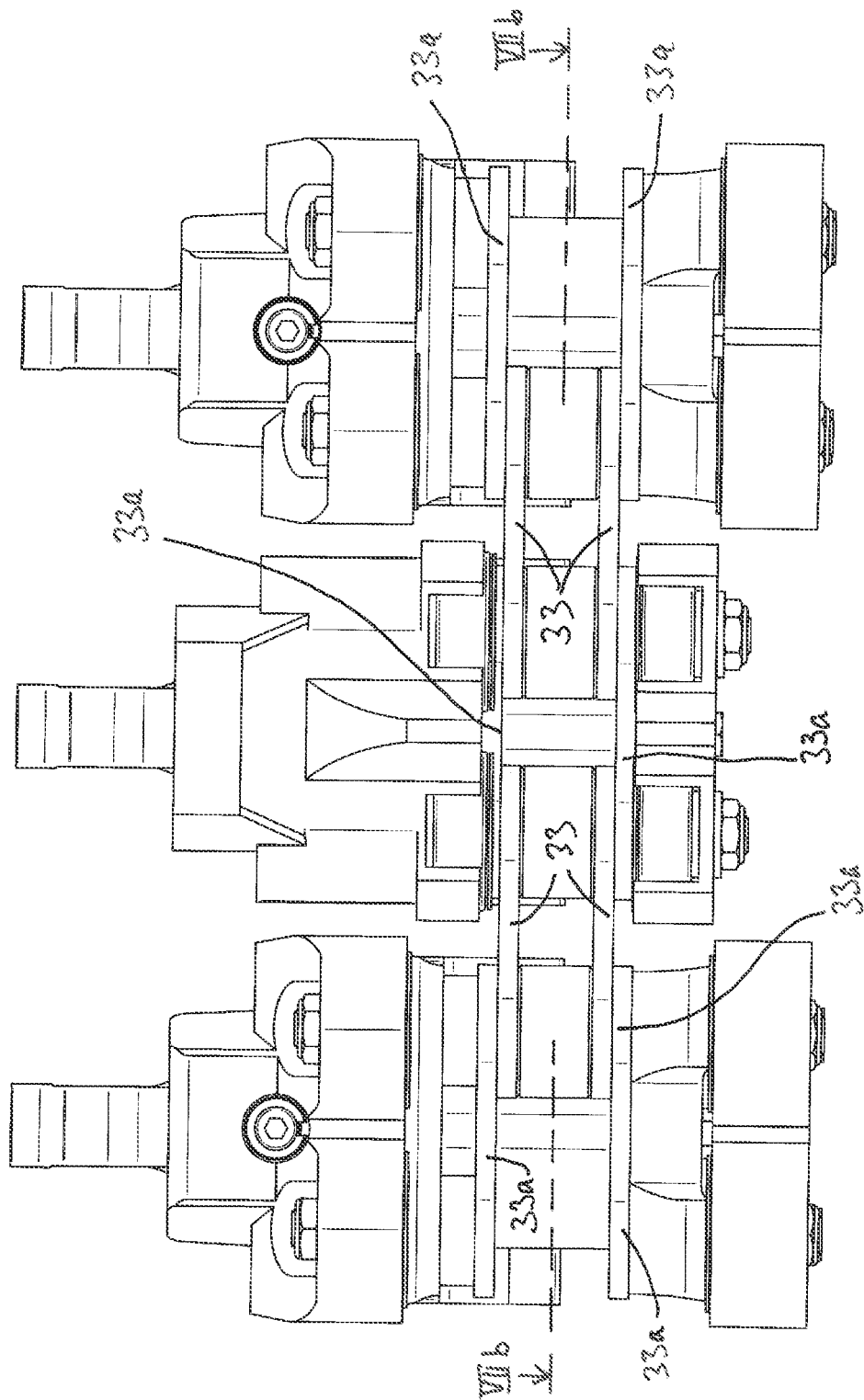

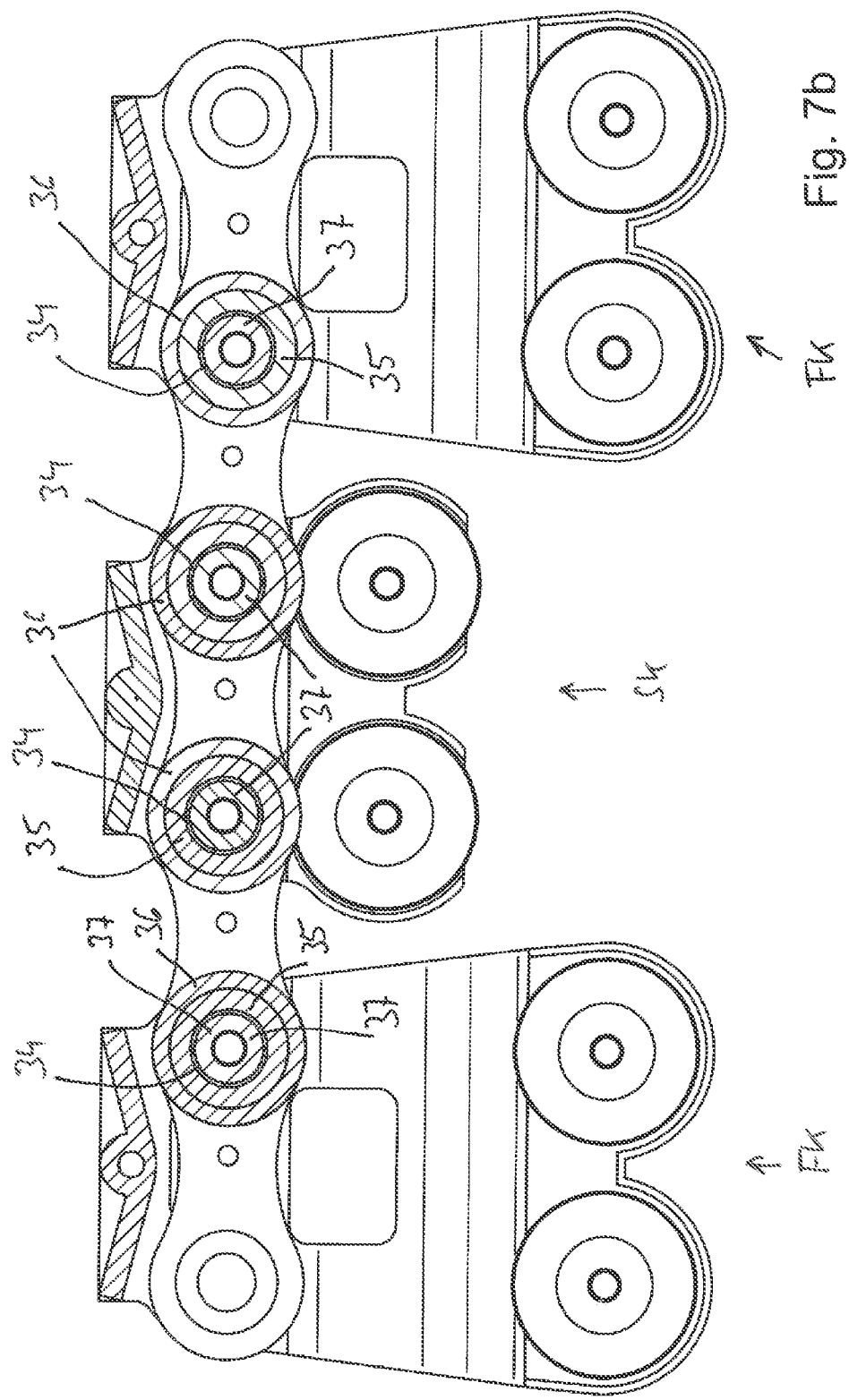

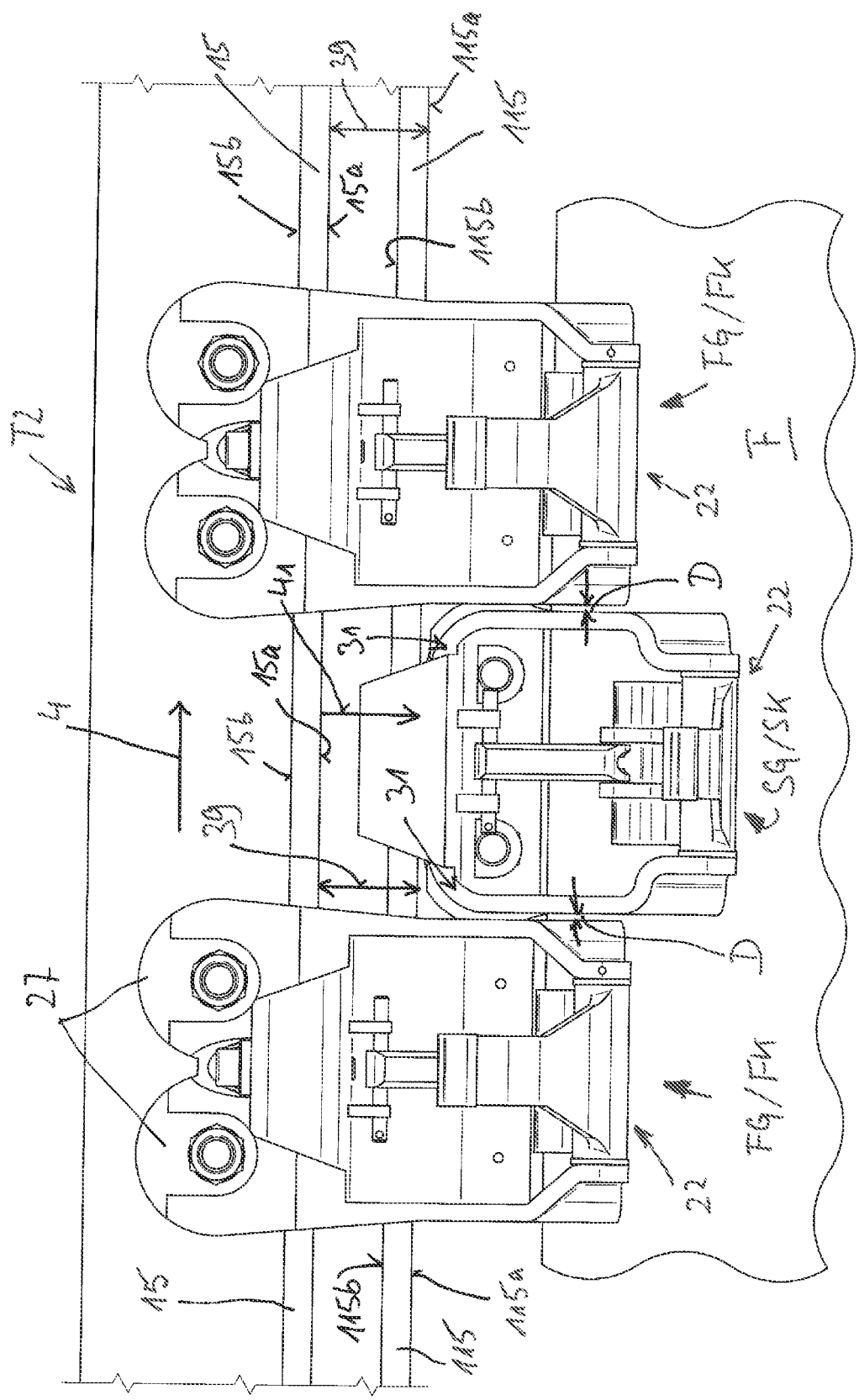

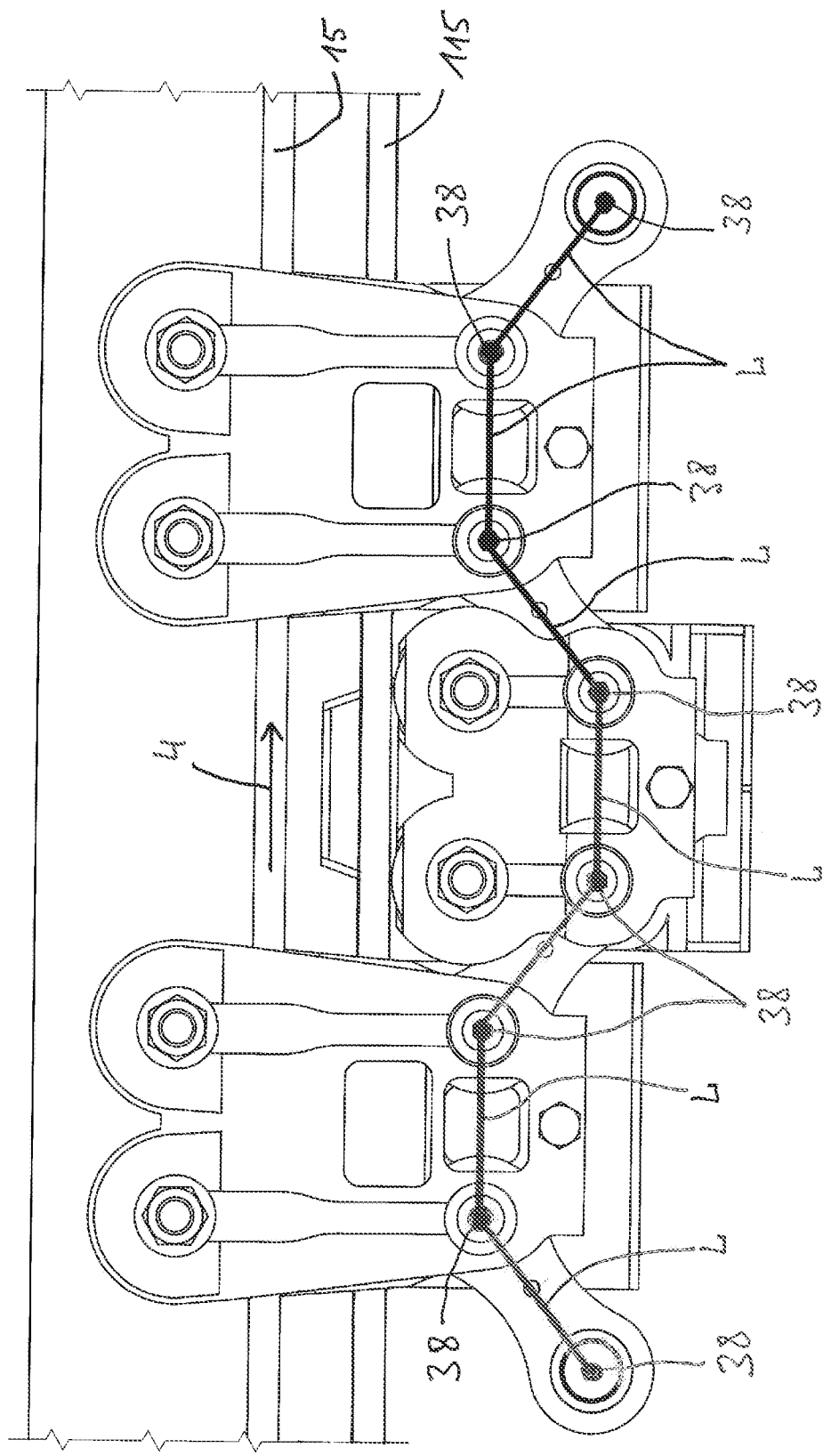

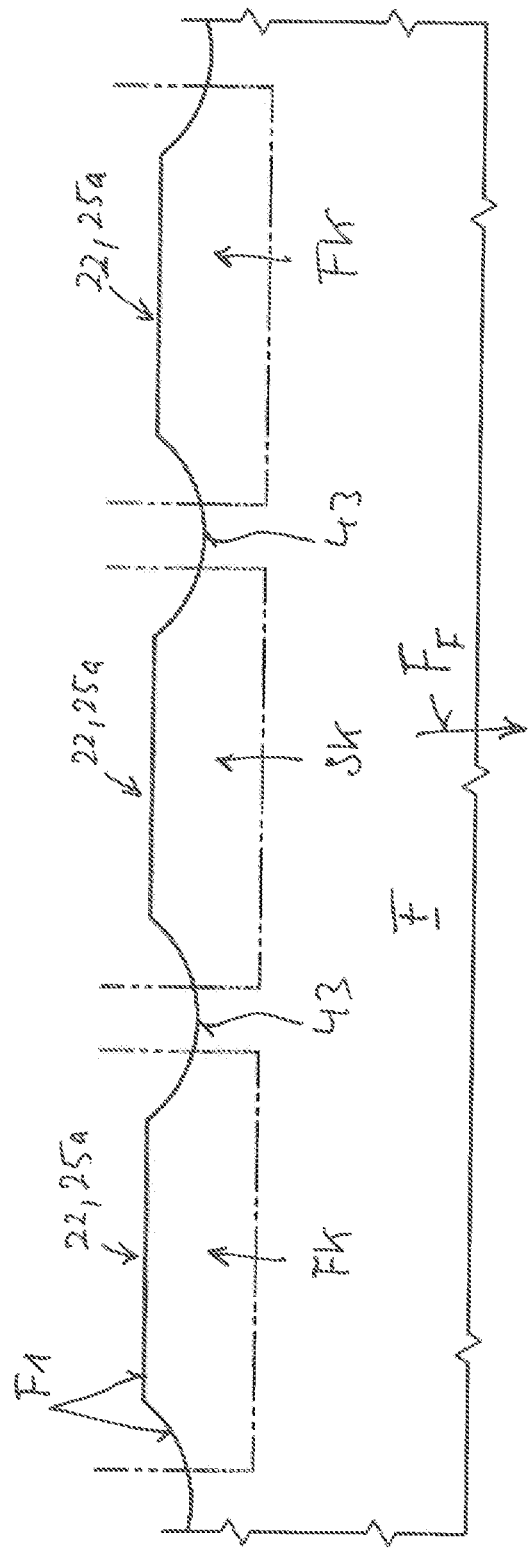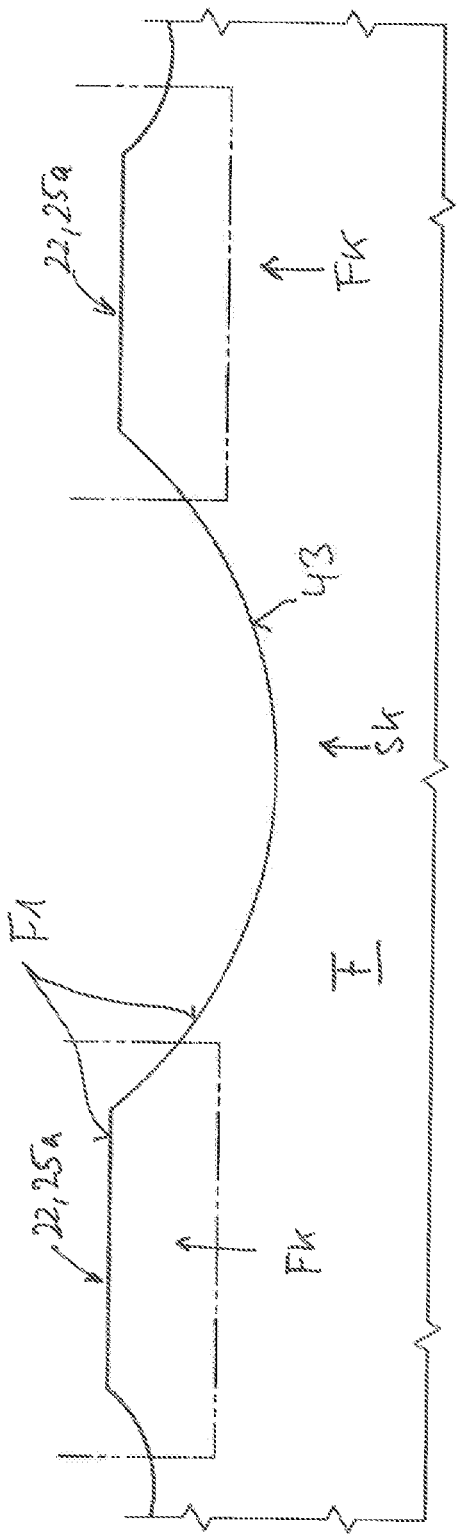

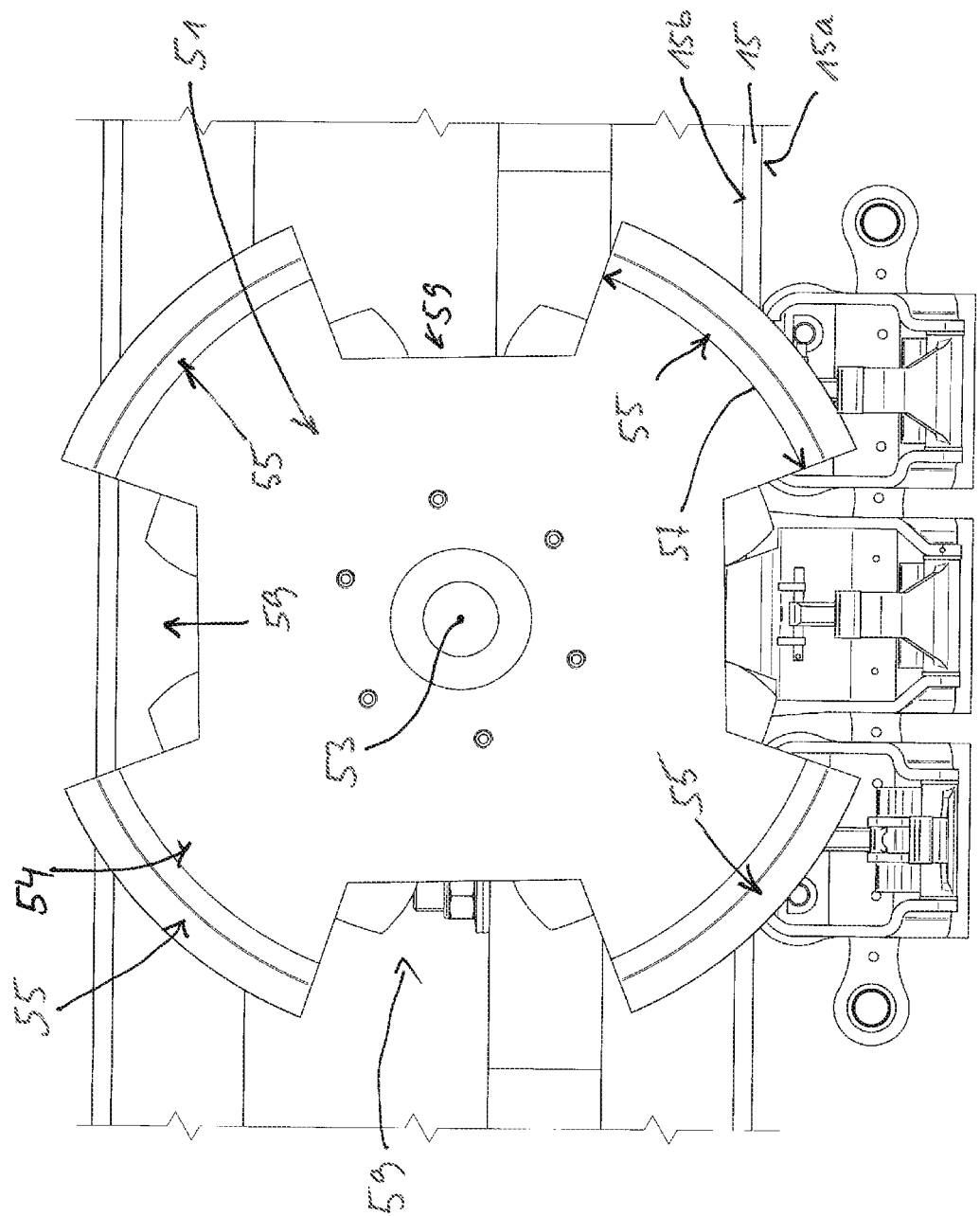

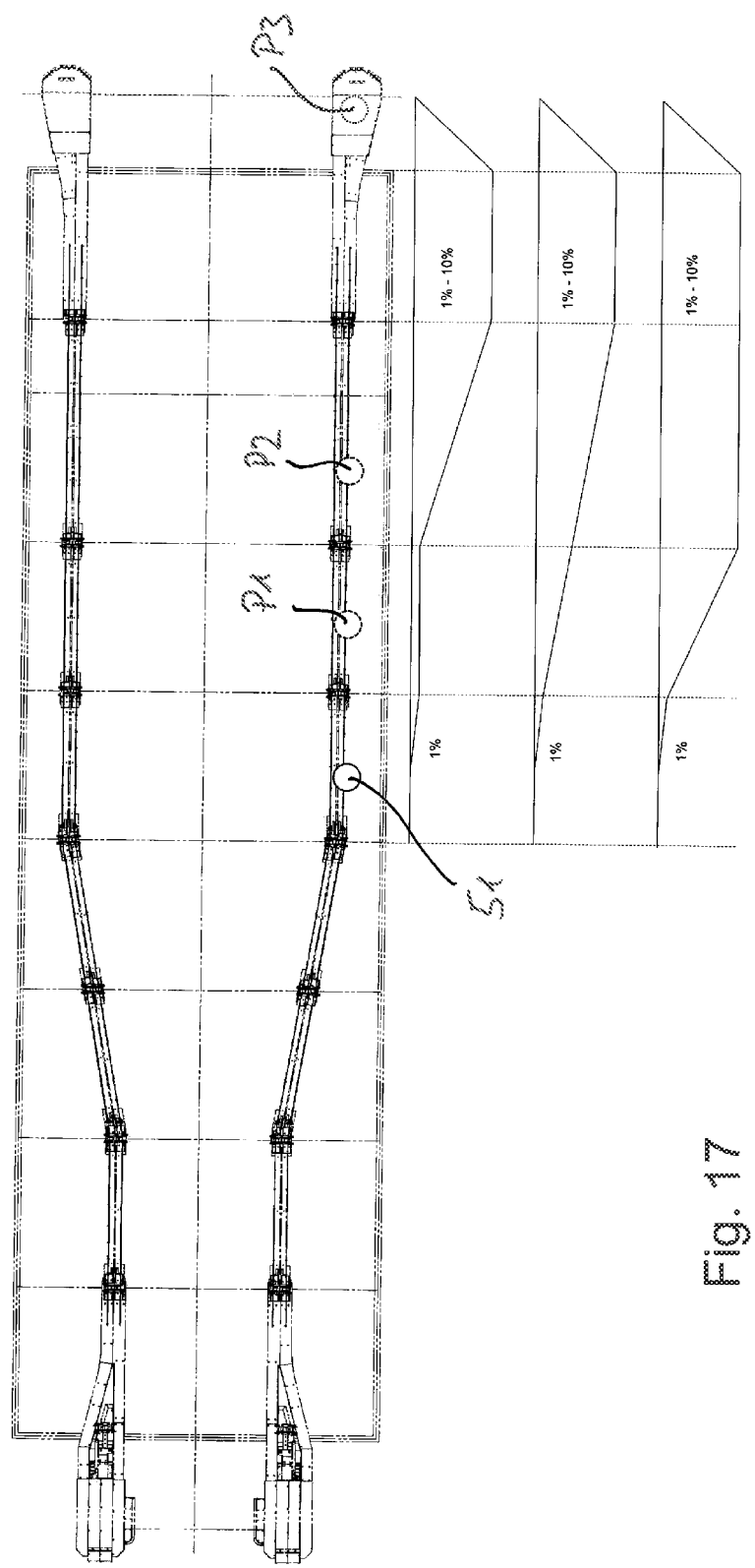

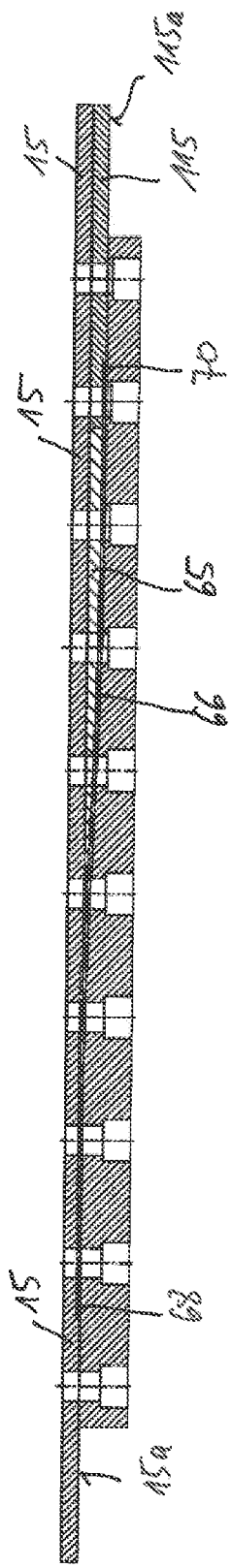
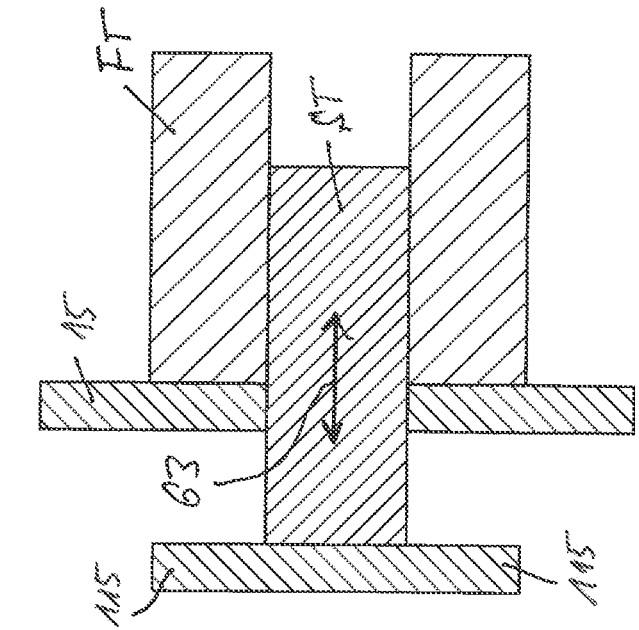
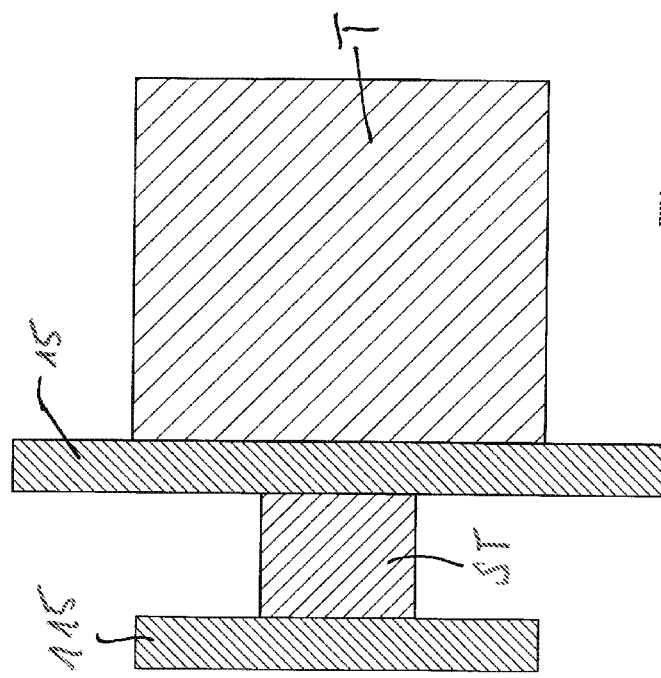

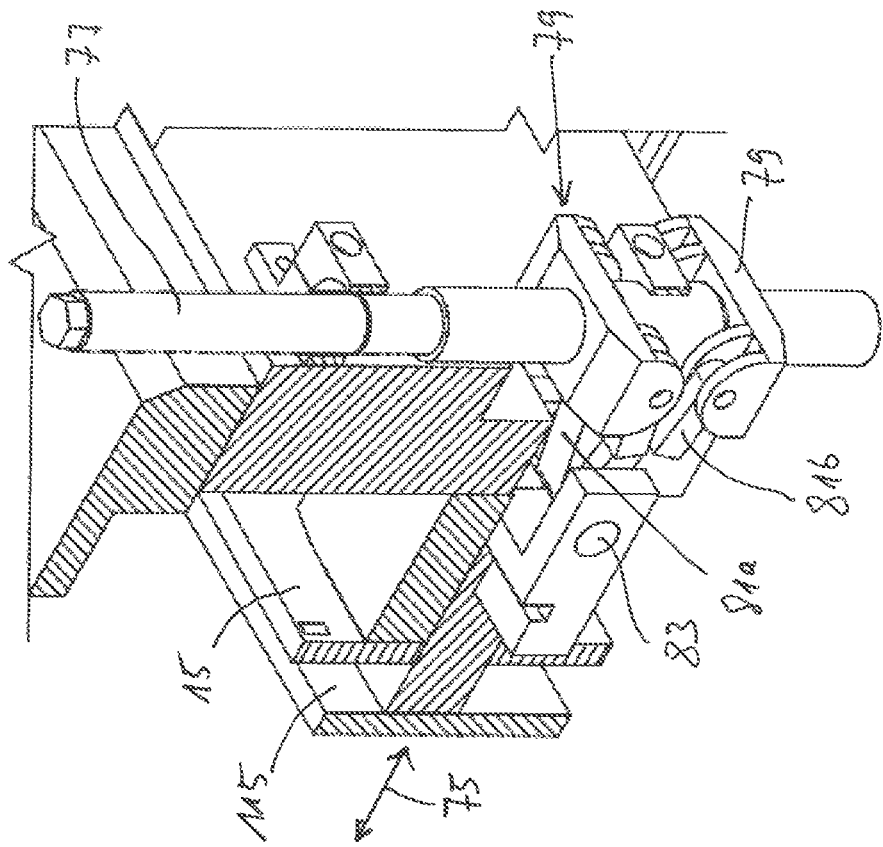
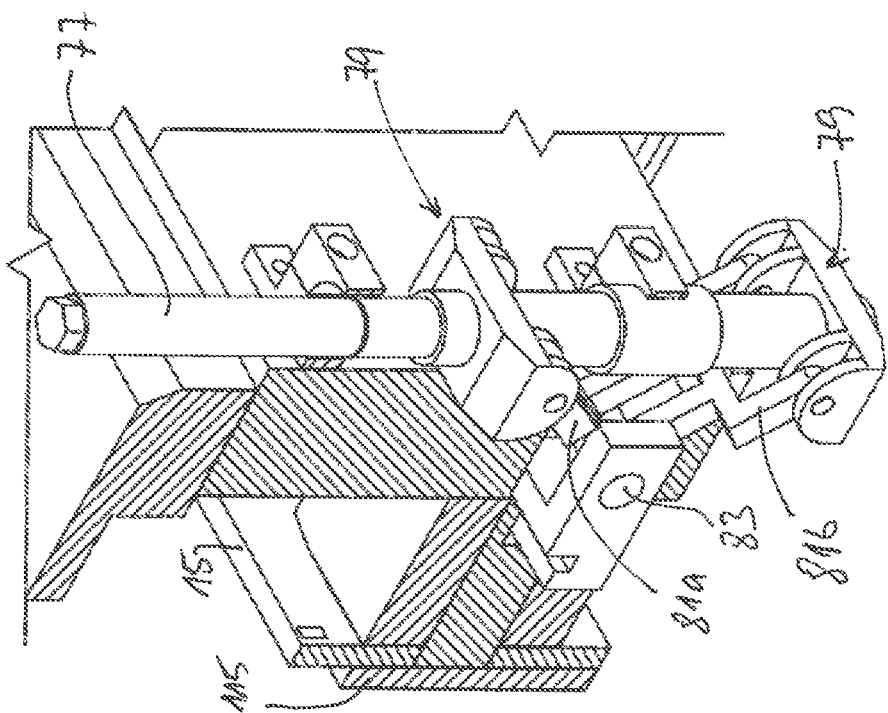

STRETCHING SYSTEM

This application claims priority to DE Patent Application No. 10 2017 117 420.6 filed Aug. 1, 2017, the entire contents of which are hereby incorporated by reference.

The invention relates to a stretching system in the form of either a sequential stretching system or a transverse stretching system according to the preamble of claim 1.

Stretching systems are used in particular in the production of plastics films. In addition to "simultaneous" stretching systems, in which the plastics film is simul-taneously stretched in the transverse and longitudinal direction, in particular "sequential" stretching systems are also known, in which a plastics film is stretched in two successive stages, for example first in the longitudinal direction and then in the transverse direction (or vice versa) to produce a plastics film in this way.

The material web to be stretched (generally a plastics film) is gripped by means of a clamping apparatus, known as clips, arranged on either side of the material web being stretched so as to be movable on circulating guide rails. In the process, the clips are moved one after the other from an infeed zone (in which the edge of, for example, a plastics film to be stretched is gripped) through a stretching zone (in which the opposing clips on the guide rail portions are moved away from one another in a diver-gent manner with a transverse component with respect to the conveying direction) to a discharge zone, and then back to the infeed zone on the way back, it being possible, for example, for the film to be relaxed to a certain extent and/or undergo secondary heat treatment in the discharge zone.

The sequential or transverse stretching systems mentioned at the outset typically comprise two guide tracks arranged symmetrically with respect to a vertical plane of symmetry, each guide track comprising a guide rail that cir-culates in part or as a whole and along which "clip members" or "clip carriages" are displaced or moved.

The clips are thus required for moving the material web, in particular the film being stretched, in the longitudinal direction. The clips or clip carriages are generally fastened to circulating chains (endless chains) that are arranged on either side of the material web being stretched so as to be movable on the aforementioned circulating guide tracks. Within the actual stretching zone, the guide tracks run on diverging paths, and so the lateral distance increases between the clips that can move on the two side circulating tracks. In the process, the film is stretched in the transverse direction.

With some film types, the stretched film needs relaxing in order to obtain different properties, regardless of whether it has been stretched in one axis or sequentially in two axes. Relaxing the film in the transverse direction with respect to the film take-off direction has long been known and can be achieved by adjusting the working width of the stretching system by, for example, reducing the working width once the film has been stretched.

Since the film is held by the clips or "blade flaps" continuously throughout the passage through the stretching system, and the distance between the clips is constant since the clips are connected to chain links and these links do not allow the length to be adjusted in the chain longitudinal direction, relaxation in the take-off direction of the film, i.e. in the machine direction, is not possible or is only possible using additional measures.

In this respect, EP 2 629 960 B1, EP 2 629 959 B1 or EP 2 570 253 B1 have already proposed using two endless chains in a transverse stretching system to drive the clips to the left and right of the film being stretched, each endless chain alternately comprising chain links of a first type and chain links of a second type. A clip or a clip body is fastened to every other bolt of the chain links. The chain links comprise casters by which said links roll on a guide rail.

In addition to the guide rail, however, a control rail protruding beyond the guide rail towards the chain is also provided on a part of the circulating guide track. In this case, the chain links of the first and second type are formed differently, each chain link of the first type comprising a roller protruding towards the corresponding guide rail so as to be able to run onto the control rail.

As a result, the chain is deformed in its extension position, the individual chain links adopting an at least slightly angular position relative to one another at the engagement points with respect to their maximum extension, thereby reducing the distance from the adjacent clip.

As a result, the plastics film can be relaxed (tension relief) by a few percent in a relaxation zone, for example.

In this respect, for example CN 203543104 U and U.S. Pat. No. 9,073,257 B2 disclose similar solutions for reducing the distance between two clips adjacent to one another in the take-off direction by using an additional control rail in addition to a guide rail.

Against this background, the problem addressed by the present invention is that of producing an improved transverse stretching system or a sequential stretching system having a transverse stretching stage in order to be able to alter the distance between two clips that are adjacent to one another in the circulating direction.

According to the invention, the problem is solved according to the features set out in claim 1. Advantageous embodiments of the invention are set out in the dependent claims.

Within the context of the present invention, a completely new solution is proposed, in which, for example, the distance between two successive clips can be altered, for example in order to relax a plastics film and/or alter the chain tension.

The basic principle behind the invention is based on al-tering the position of some of the clips in the transverse direction transversely to the guide track by means of a control rail in the regions in which the distance between two successive clips should be reduced (generally in the oven through which the conveyor device is moved).

Since these clips (also referred to as control clips hereinafter) are directly or indirectly connected, at least by means of a connection member, to an adjacent clip that cannot move transversely to the guide track (also referred to as guide clips hereinafter), the transverse movement of the control clips transversely to the advance direction of all the clips pivots the connection member, thereby reducing the distance between a guide clip and a control clip, and thus between two successive guide clips.

In the process, the control clip can move transversely either towards or away from the plastics film being stretched. In both cases, the relevant control clip whose position is adjusted with a transverse component with respect to the advance direction preferably unclips, i.e. the clip or blade flap is opened so that the clip is no longer holding the film edge.

In this respect, the invention can be implemented, for example, by pivotally connecting the individual clips, and in particular also a guide clip, to a control clip downstream therefrom by means of a connection member, for example by means of a single chain link or a chain-like connection member. However, it is also possible to use a continuous (endless) chain that can have identical or different chain links in a regular sequence, a chain link referred to as a guide member then being connected to the guide clip and a chain link referred to as a control chain link being connected to the control clip, a connection chain link being provided between the guide clip chain link and the control clip chain link.

In simple terms, the invention can also be referred to as the "trapezoidal solution" since, when the control clips are adjusted, their additional transverse movements preferably relative to their adjacent guide clips cause at least two casters, which are offset in the circulating direction and form a caster pair in plan view, to roll onto running surfaces of a control rail that are offset in the transverse direction, and each oblique connection member extends therebetween such that the caster axes are arranged or positioned on the guide and control clips in a trapezoidal manner.

Preferably, guide clips and control clips are provided alternately, and so, for example, every other clip is a control clip that can be deflected or adjusted transversely to the drive direction in order to reduce the distance between two successive guide clips.

However, any other order is also possible, and so a wide range of possibilities are possible to alter the distance between two adjacent clips and/or to tension a chain by shortening the overall length of a corresponding chain arrangement.

In order to alter the distance between a guide clip and a control clip and thus reduce the size of a gap, at the desired points on the guide track, a control rail that is active in these regions and is typically provided with an upward and downward ramp can be rigidly provided in addition to the guide rail, as a result of which the control clips can be adjusted transversely to the circulating direction according to the circulating speed.

In a preferred embodiment of the invention, the control rail is at least variably adjustable, it being possible in a particularly preferred variant for the rail to be adjusted either manually or by a motor, possibly even during operation.

If the control clips are deflected (adjusted) away from the film in the transverse direction with respect to the advance movement, this control clip generally unclips at the start of the transverse movement, releasing the edge of the film.

If a corresponding control clip is adjusted transversely towards the plastics film, the blade flap can also be opened and thus the film edge released at a later point in time after the transverse movement has begun, or this can even be omitted in extreme cases.

Therefore, it is clear from the explanation that, for example, the control clips unclip when they run in a ramp-like manner onto the control rail offset from the guide rail and open their clamping devices, i.e. are moved into the releasing position, in order to release the film edge, whereas adjacent guide clips continue to hold the film edge and to move the film further through the stretching system. However, the clamping or clip devices on the control clips can also be opened before reaching the control rail, while they are running onto the ramp-shaped portions of the control rail or even at a later point in time when all the control clips have already run onto the control rail, which, apart from the ramp-shaped portions at the start and end of the control rail, typically extends more or less in parallel with the guide rails and the running surfaces thereof.

To selectively open the control clips, various measures can be taken. For example, the blade flaps of the control clips can be made longer so that they protrude beyond the height of the blade flaps of the guide clips, in which case only the control clips can be selectively opened by mechanical and/or magnetic means.

For this purpose, an opener wheel is preferably used to selectively open only the control clips but not the guide clips.

Generally speaking, by means of the special design of the aforementioned opener wheel, the invention makes it possible for only every other or every xth blade flap to be actuated, for example. Alternatively, it would also be conceivable for every other or every xth blade flap to be magnetic and for there to be a magnet for the purpose of opening.

Opening devices of this kind can be positioned at any point on the stretching system.

Further advantages, details and features of the invention will become apparent from the embodiments set out below.

In the drawings:

FIG. 5 is a view from the rear of a first embodiment having guide and control clips that are interconnected by separate, individual connection members;

FIG. 6 is a horizontal sectional view along the line VI-VI in FIG. 5;

FIG. 7a is a view from the rear of a modified embodiment using an endless chain, similar to the embodiment in FIG. 5;

FIG. 7b is a horizontal sectional view according to the line VIIb-VIIb in FIG. 7a;

FIG. 9 is a view corresponding to FIG. 8 in which the guide clips are moved further on the guide rail and the control clip is moved further along a control rail offset therefrom, thereby reducing the lateral distance between two guide clips;

FIG. 10 is a view similar to FIG. 9, illustrating the trapezoidal configuration in terms of a roller pair on a guide clip and a subsequent roller pair on a control clip;

FIG. 14a is a schematic cut-out view of a film portion having an associated film edge and the clips placed thereon, as a result of which indentations are produced at the film edge due to the active forces within the film, and specifically in a state where both the clamping device of the guide clips and the clamping device of the control clips are clamping the film edge;

FIG. 14b is a view corresponding to FIG. 14a, although in a state where the film edge is held only by the clamping device of the guide clips and the clamping device of the control clips is open, and so the film edge is released in the region of the control clips and the indentations thus become larger;

FIG. 16 is a plan view of the opener wheel shown in FIG. 15, illustrating how the clamping device selectively opens only the control clips;

FIG. 17 is a schematic plan view of a transverse stretching system or stage showing, by way of example, the points at which the opener wheel shown in FIGS. 15 and 16 can be arranged;

FIG. 18 is a schematic cross-sectional view of a ramp-shaped transition from a guide rail 15 to a control rail 115;

FIG. 19a is a schematic cross-sectional view vertically through a guide rail and a control rail, illustrating how the control rail can be rigidly mounted in front of the guide rail;

FIG. 19b is a cross-sectional view similar to FIG. 19a, showing a control rail that is adjustable relative to the guide rail;

FIGS. 21a to 21d are spatial cross-sectional views through an adjustment mechanism having a holding device and a guide rail and control rail, illustrating how a control rail can be positioned in various positions relative to the guide rail by means of the adjustment mechanism.

Figure 1:
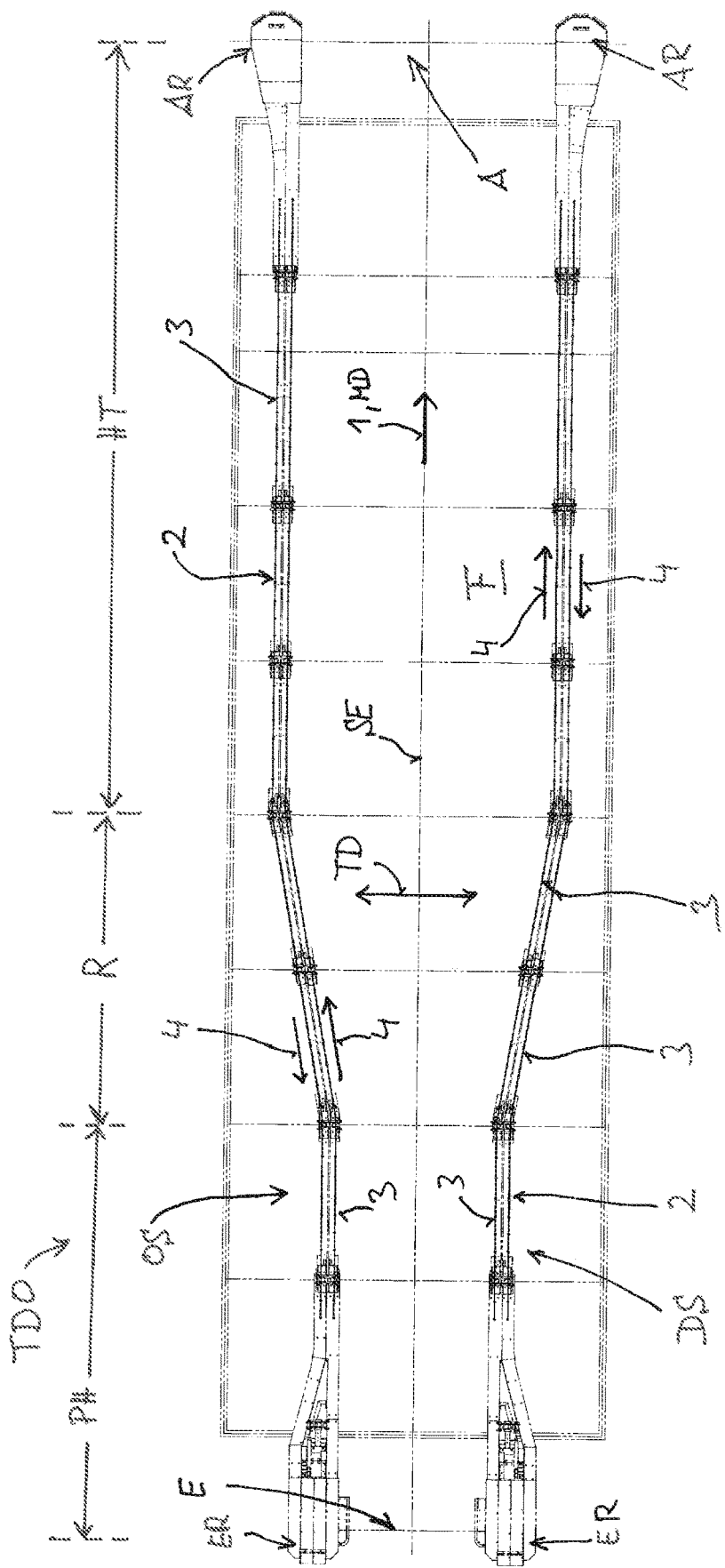
FIG. 1 is a schematic plan view of a transverse stretching system or a transverse stretching stage.

Basic Design of a Transverse Stretching System:

As is known, the film-spreading or transverse stretching system described below (also referred to in short as a TDO stretching system (transverse direction oven)) comprises two generally symmetrical drive systems. FIG. 1 shows the two drive systems extending vertically with respect to the drawing plane and arranged symmetrically with the plane of symmetry SE, the material web to be processed, i.e. stretched, in particular in the form of a plastics film F, being moved in the take-off direction 1 in the machine direction MD between the two drive systems, which circu-late on closed tracks 2. In this case, the aforementioned TDO stretching system can also be a part of a sequential stretching system, which typically comprises a longitudinal stretching stage upstream of the transverse stretching system (transverse stretching frame) (in case of doubt, said longitudinal stretching stage can also be arranged downstream of the transverse stretching stage).

A monoaxial or uniaxial film F (i.e. when a longitudinal stretching system is arranged upstream of the transverse stretching stage shown) or an unstretched film F (although a film is mentioned in the following, a stretching system of this kind can in general likewise process and transversely stretch a processing web F, meaning that the invention is not limited to plastics films in this respect) arrives at the stretching system in the infeed region E, where it is grasped and clamped by clips (to be explained below), as shown for example in FIG. 2, at both side edges, and specifically on both the "operator side" and the "drive side". The film F is then heated in a subsequent pre-heating zone PH and next fed to a stretching zone R, where it is stretched in the transverse direction TD. Next, the stretched film F passes through various heat-treatment zones HT, in which the film can also be relaxed. At the end of the stretching system in the discharge zone A, the film is unclipped by suitable means and then exits the transverse stretching machine, or transverse stretching system.

Therefore, a conveyor system 3 is driven in the circulating direction 4 on the two circulating tracks 2, for which purpose the two conveyor systems comprise a plurality of clip conveyor units KT.

FIG. 1 also shows a discharge wheel AR, located in the discharge region A, for each closed circulating guide track 2, as well as an input wheel ER, located in the input region E, for each guide track. The circulating conveyor system 3 is driven by means of the driven discharge wheel AR, the input wheel ER potentially also being driven under partial load.

Within the context of the invention, the clip conveyor units KT comprise guide clips FK and control clips SK, the significance of which will be discussed further below.

Figure 2:
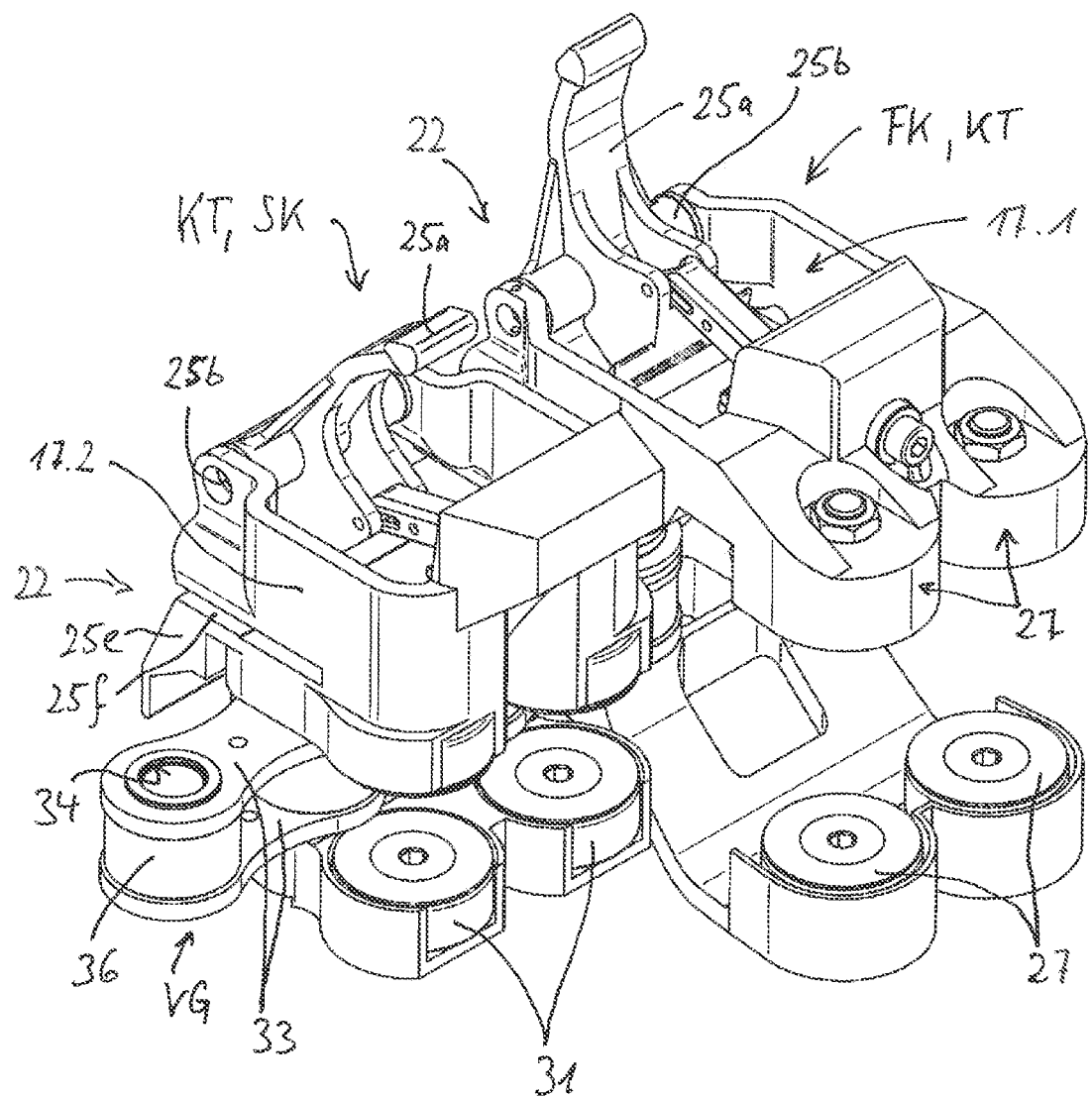
FIG. 2 is a spatial view of a guide clip and a control clip.

FIG. 2 is a schematic perspective view from the front left-hand side of portions of a control clip SK and, to the right thereof, a guide clip FK. At this juncture, it should be noted that the term "clip" also means or is used as a synonym for "clip members", "clip carriage" and the like. This applies likewise to the terms "guide clip" and "control clip".

Figure 3:
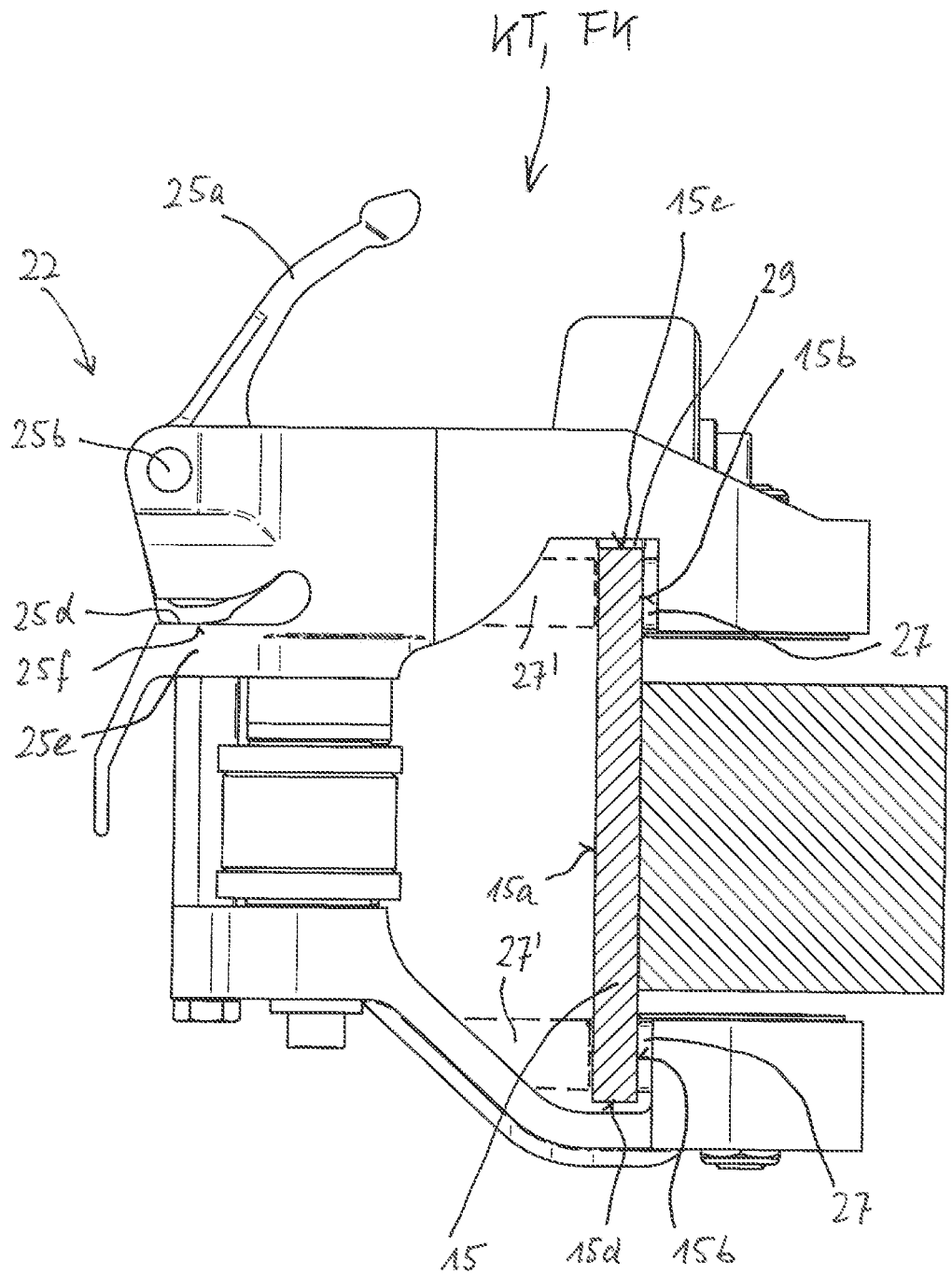
FIG. 3 is a side view of a guide clip vertically through the cross section of a guide rail.

It can be seen from the view in FIG. 2 and a schematic cross-sectional view according to FIG. 3 that the guide clip FK comprises a clip body 17.1, and specifically having a clamping device 22 in the form of a clip lever 25a that can be pivoted between a releasing or open position and a closed position by means of a clip pin 25b. In this context, the clip lever 25a is often referred to as a blade flap 25a. By means of an arrangement of this kind in a film stretching system, a film F can be secured to a clip table 25e, i.e. clamped and held in place, between a gripping surface 25d at the lower end of the clip lever 25a and a clamping surface 25f.

At this juncture, it should be noted that not every clip conveyor unit KT has to comprise just one clip lever having a corresponding clip table, etc., but can also comprise a plurality of clip levers, for example two clip levers, that can be pivoted typically by means of an axially aligned clip pin.

A clip conveyor unit KT of this kind, referred to as a guide clip FK, can be moved along a guide rail 15. The guide rail 15 is generally rectangular in cross section perpendicular to its longitudinal extension, its largest cross-sectional extension generally extending in the vertical direction. A guide rail of this kind then comprises two vertically extending running surfaces 15a, 15b, one running surface 15a pointing towards the film or the clamped side of a film and the parallel running surface 15b pointing in the opposite direction, i.e. to the rear. Said running surface 15b pointing away from the clamping side or film side will also be referred to as the rear running surface 15b in the following.

A guide rail 15 of this kind therefore generally also has an upper supporting running surface 15c, unless a separate support rail is also provided. In certain cases, the running surface 15d pointing downwards and located below the supporting running surface 15c is used as a counter running surface.

In the embodiment shown, the guide clip comprises a plurality of track wheels 27, which can also be referred to as guide rollers 27. From FIG. 2 it can be seen that one pair of the four guide rollers 27 is an upper pair and another pair of guide rollers 27 is a lower pair, and so the guide rollers 27 of each guide roller pair, which are offset from one another in the circulating direction 4 (see FIG. 1), can roll on the rear running surface 15*b* of the guide rail 15.

The cross-sectional view according to FIG. 3 also shows that, in the guide clip FK, there are no other casters/guide rollers rolling, for example, on the inner or clamping-side running surface 15*a*. Film-side or clamping-side casters 27' of this kind can be provided, however, and are shown in dashed lines in FIG. 3. In this case, at least one or more of the casters 27' would typically also be used, for example also another upper and another lower guide roller pair, such that the corresponding guide clip FK is additionally guided on the guide rail 15 by means of these casters 27', without being adjustable in the transverse direction with respect to the running surfaces 15*a*, 15*b*. The corresponding weight of the guide clip is borne by the one or more upper weight rollers 29 that rotate about a horizontal axis and roll on the upwardly pointing supporting running surface 15*c* (the weight roller 29 in FIGS. 2 and 3 being arranged within a caster housing that is open at the bottom towards the upwardly pointing running surface 15*c*, and therefore being hidden in FIG. 2 and barely visible in FIG. 3).

Where necessary, it would also be possible to provide a counter-roller that preferably rolls on the downwardly pointing counter running surface 15*d* under pretension. However, this is not fundamentally required.

The control clip SK shown in FIG. 2 also comprises a clip body 17.2 having a clamping device 22. Otherwise, being equipped with its clip lever 25*a* that is pivotable about a clip pin 25*b*, a gripping surface 25*d* and a clip table 25*e* having an upwardly pointing clamping surface 25*e*, the control clip SK is similar or identical to the corresponding embodiments of the guide clip FK.

Figure 4:
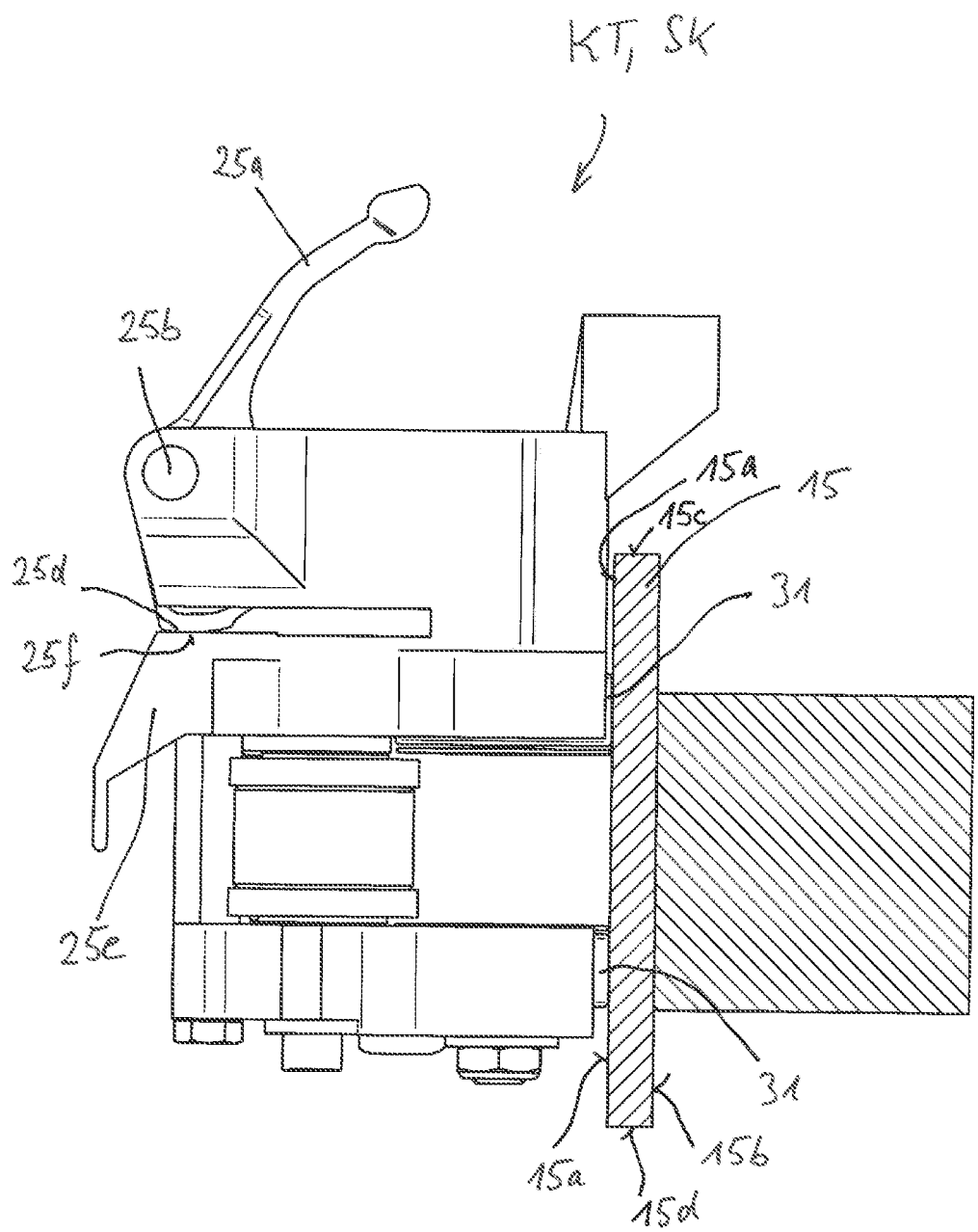
FIG. 4 is a side view of a control clip in a vertical section through the guide rail.

However, it can be seen from the cross-sectional view in FIG. 4 that, in the embodiment shown, the control clip SK only comprises casters 31 (also referred to as control rollers 31) that roll only on the film-side or clamping-side running surface 15*a*. In this case, each control clip SK preferably comprises two upper control rollers 31 and two lower control rollers 31, i.e. also at least two pairs of control rollers each arranged so as to be offset from one another in the circulating direction 4. In this respect, the design is at least similar to that of the guide clip FK, with the sole difference that, as shown in the embodiment, the guide clips FK preferably comprise only guide rollers 27 that roll on the rear running surface 15*b*, whereas the control clips SK only comprise control rollers 31 that roll only on the opposite film-side or clamping-side running surface 15*a*.

The overall design is preferably such that one guide clip FK and one subsequent control clip SK, which is then followed in turn by a guide clip, etc., are arranged in an alternating manner in the circulating direction 4, as can be seen for example in the view from the rear in FIG. 5.

At this juncture, however, it should be noted that any other sequence is possible within broad limits. For example, a control clip need not always follow a guide clip, but instead two or more guide clips can also follow one another and only then is at least one or for example two guide clips provided, before one or more guide clips follow again. Consequently, the clips can be strung together is almost any way, making it possible to adapt to the circumstances to an optimum extent.

As shown from the view from behind without the guide rail 15 according to FIG. 5, clip conveyor units KT formed and arranged in this way can be hinged together by means of connection members VG, said connection members VG being able to be formed as individual chain links. For this purpose, the connection member V6 in the embodiment shown comprises a pair of connection lugs 33 that are arranged in parallel with one another at an axial distance and each comprise two holes 34 (FIG. 6), in the axial extension of which between the two tabs 35 a sleeve 35 is arranged, meaning that the two connection lugs 33 may be rigidly interconnected but need not be connected. As necessary, a small roller 36 in the form of an outer sleeve that can rotate on the sleeve 35 therebelow can be mounted on said sleeve 35. In the view according to FIG. 5, in relation to the connection members VG formed as chain links between the two lugs 33 offset in the axial direction, only the small roller 36 located therebetween can be seen in full, said sleeve 35 being arranged below said small roller.

From FIG. 5, it can also be seen that each chain-like connection member VG is provided as an individual chain link that is not connected to the next chain-like connection member VG.

FIG. 6 is a horizontal section along the line VI-VI in FIG. 5. It can be seen that the aforementioned holes 34, which pass through the inner sleeve 35 and the lug ends of the connection lugs 33, are each penetrated by a bolt 37 that is rigidly held and anchored on the clip bodies 17.1 at its two opposite ends, i.e. one end on the clip body 17.1 of the guide clip FK and one on the clip body 17.2 of the control clip SK. Corresponding holes are provided in each clip body 17.1, 17.2, in which the relevant bolts 37 are then inserted and consequently rigidly anchored on the respective clip bodies. As a result, each chain link acting as a connection member VF is pivotable about the pivot pin 38 passing centrally through each bolt 37 (also referred to in some parts of the following as an anchoring bolt 37) relative to a guide clip FK at one end and relative to a control clip SK provided at the other end of the connection member VG. The bolts 37, and therefore the pivot pins 38, extend perpendicularly to the circulating direction 4 of the guide clips FK and control clips SK, and so in parallel with the guide surfaces 15*a*, 15*b* of the guide rail, and with the guide surfaces 115*a*, 115*b* (to be explained further below) of a control rail 115.

The result is a conveyor device circulating on both guide tracks 2 or a circulating conveyor system, the guide clips FK and the control clips SK each being interconnected alternately by arranging a connection member VG therebetween, and thus being moved further along the guide rail 15. In the conveyor system, the following sequence is thus produced:

FK-VG-SK-VG-FK-VG-etc.

By way of deviation from connecting the two successive clip conveyor units KT by arranging just one connection member VG therebetween, a continuous (endless) chain can also be used as the conveyor system 3, as can be seen in the view from the rear according to FIG. 7*a* and the cross-sectional view along the line VIIa-VIIa in the cross-sectional view according to FIG. 7*b*.

In these drawings, in addition to the aforementioned connection members VG as described on the basis of FIGS. 5 and 6, additional external connection lugs 33*a* are provided, and so the individual connection members VG described on the basis of FIGS. 5 and 6 are now connected by the additional pairs of external connection members 33*a* to form a continuous conveyor chain 3*a*. The aforementioned bolts 37 then still pass through corresponding holes 34*a* in the external connection lugs 33*a*.

This does not change anything regarding the overall design and overall sequence.

In the last-mentioned case according to FIGS. 7*a* and 7*b*, it can be said that the conveyor system 3 is formed as a conveyor chain 3*a*, the conveyor chain 3*a* comprising, in succession, a guide member FG, a connection member VG, a control member SG, a connection member VG and a further guide member FG, etc., a guide clip FK being fastened to and moved together with the respective guide members FG and a control clip SK being fastened to and moved together with the respective control members SG.

By contrast, in the embodiment according to FIGS. 5 and 6, the circulating and driven conveyor system 3 comprises guide members in the form of guide clips FK and control members SG in the form of control clips SK.

By means of the conveyor system 3 formed in this way, therefore, the individual members FG, VG and SG are moved onwards by generating tensile forces, each member moving a subsequent member with it along the guide track 2 by applying tensile forces.

Figure 8:
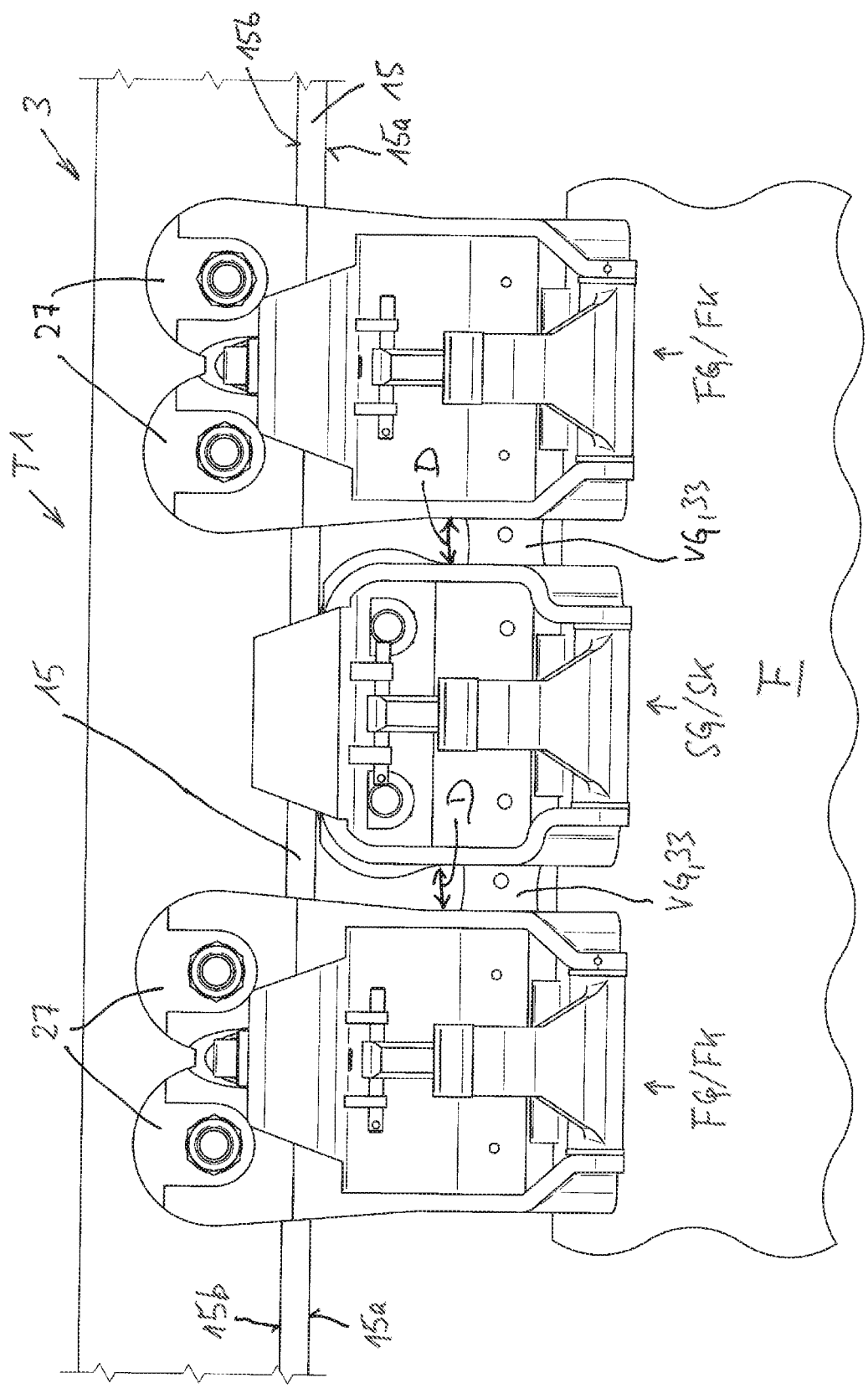
FIG. 8 is a schematic plan view of successive clips that are moved on a guide rail over a first section.

FIG. 8 is a schematic plan view showing how a conveyor system 3 formed in this manner, comprising the guide members FG having the guide clips FK and comprising the control members SG/control clips SK, which are hinged together alternately in succession by arranging therebetween a connection member VG that connects a guide member VG and a control member SG, is moved along the guide rails 15 in the non-relaxed state. In this case, the rear guide rollers 27 of the guide clips FK run on the rear running surface 15b of the runner, and the film-side or clamping-side con-trot rollers 31 of the control clip SK run on the film-side or clamping-side front running surface 15a.

Since the control members SG or control clips SK are themselves preferably not equipped with their own weight roller or plurality of weight rollers, the control members or control clips are ultimately supported by the adjacent guide members or guide clips by means of the respective leading and trailing connection members VG.

To be able to relax the film at a desired point of the stretching system in the take-off direction 1, i.e. in the machine direction, the distance between successive guide members FG/guide clips FK is now reduced.

As will be described below on the basis of FIG. 9, this is done by means of an additional control rail 115 that preferably rises up towards the film F in a ramp-like manner out of the plane of the film-side or clamping-side running surface 15a at the desired circulation point of the stretching system, and forms a control rail surface 115a that generally extends at least approximately in parallel with the guide rail, apart from the infeed-side and discharge-side ramps, and preferably extends at a distance 39 from the film-side running surface 15a until it is returned to the plane of the running surface 15a at a different desired point. In this case, therefore, a gentle wedge-like transition from the running surface 15a to the control rail surface 115a is preferably provided.

As shown on the basis of FIG. 9, the arrangement is such that the control rollers 31 of the control member SG/control clip SK roll on the control rail surface 115a, as a result of which the control member SG is moved in the transverse direction 41, generally perpendicularly to the circulating or advance direction 4, relative to the guide members FG/guide clips FK, which are moved further along the guide rail 15 in their constant position in the transverse direction. In the embodiment shown, the position of the control clip SK is altered towards the film.

Since each control member SG (in this case in the form of a control clip SK) is connected on its leading and trailing side to the respective leading and trailing guide members FG (in this case in the form of a guide clip FK) by means of a hinged connection member VG, and said connection members VG are therefore pivoted out of their aligned position, which otherwise extends in the longitudinal direction or at least approximately in the longitudinal direction, the lateral distance between a guide member FG and the subsequent control member is reduced, as is the distance between the control member and a subsequent adjacent guide member, as can be seen from comparing FIG. 9 with FIG. 8.

FIG. 9 shows the control rail 115, which is arranged such that its associated running surfaces are offset from the guide rail 15 and its running surfaces, as a result of which the position of the control clips SK in relation to the guide clips FK is altered, i.e. transversely and in particular perpendicularly to the guide rail 15 and control rail 115. As mentioned, and as known from the prior art, the control rail and its running surface 115a are connected to the guide rail or guide rail surface via a ramp that rises and falls in the circulating direction, and so the control rollers 31 of the control clips SK are transferred from the guide rail surface 15a into the control rail surface 115a via an upward ramp in as jolt-free a manner as possible, and returns to the plane or level of the guide rail surface 15a at the end of said control rail surface 115a via a downward ramp. Within a first section T1 (e.g. in FIG. 8 or FIG. 17) on the circulating guide track 2, therefore, only one guide rail 15 is provided (which can be seen in a cut-out view by way of example in FIG. 8), whereas, across at least one second section T2 (e.g. in FIG. 9 or 17) of the circulating guide track 2 (shown only in a cut-out view in FIG. 9), another control rail 115 is also active in addition to the guide rail 15, i.e. at least one other control rail surface 115a onto which the control rollers 31 roll is active in addition to the guide rail surface 15a.

As can be seen by comparing FIG. 8 and FIG. 9, when the control clip SK runs onto the control rail 115, the distance in the circulating direction 4 between a guide clip FK and an adjacent control clip SK, and thus between two successive guide clips, considerably decreases compared with the state where both the guide clips FK and the control clips SK are only moved along the shared guide rail 15.

Preferably, the clamping devices 22 on the control clips are transferred from their closed or clamping position into their open or releasing position when the control clips SK are in the region of their at least one second section T2, in which they run onto the control rail 115 and are moved in the transverse direction transversely to the guide clips FK. In the process, the opening movement for the clamping device can be carried out even before said device runs onto a ramp that transfers the control clips SK onto the control rail (as soon as it runs onto a ramp-like protrusion on the control rail), or even once the full height of the control rail (at which it extends more or less in parallel with the guide rail) has been reached, or at another later point in time.

Figure 9A:
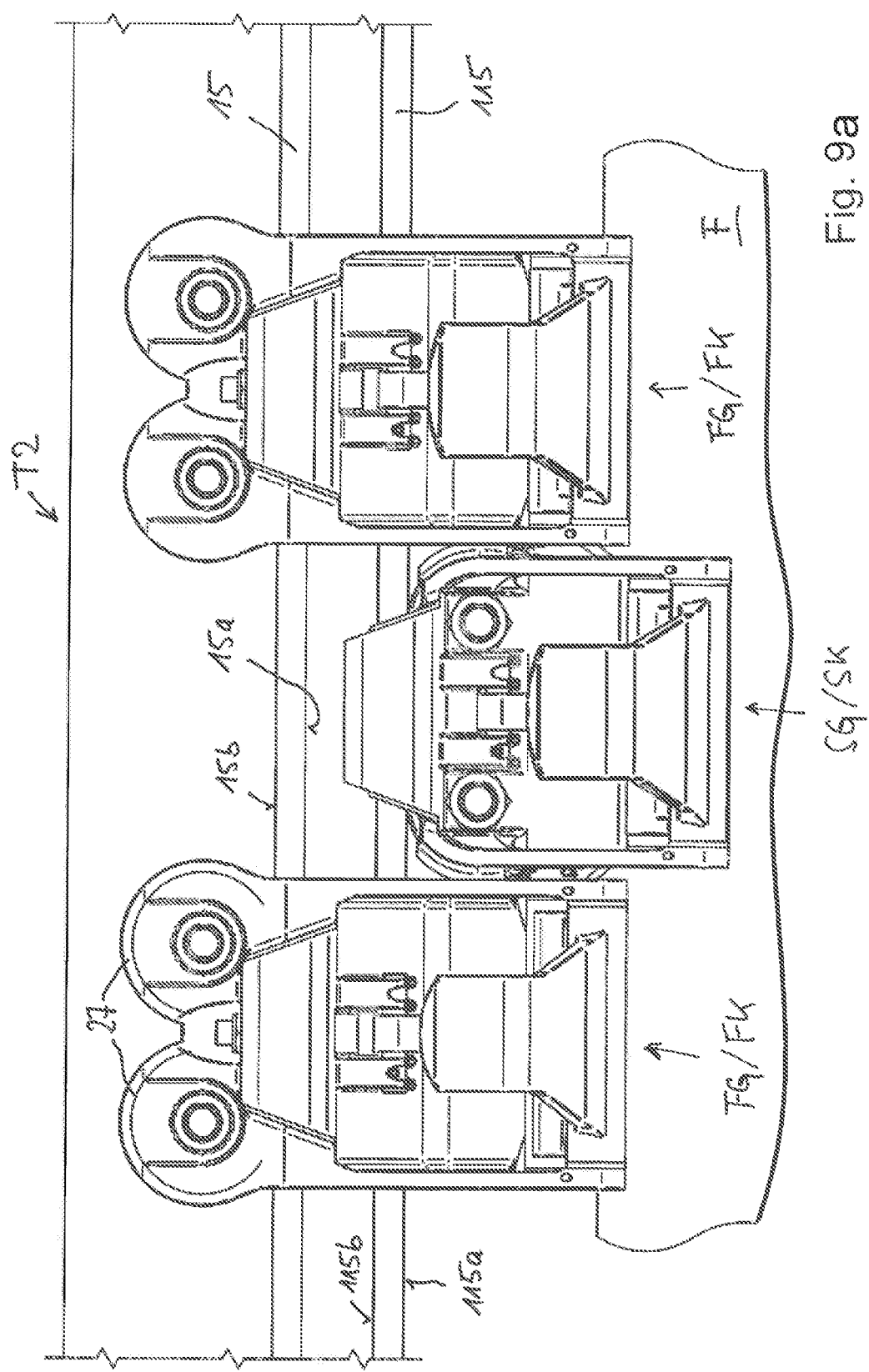
FIG. 9a is a view corresponding to FIG. 9, although in this view the guide clips and the control clips, which are moved on a control rail offset from the guide clips, are still in their clamping and closed position in the region of a second section and are not open.

By way of deviation from the above embodiment according to FIG. 9, when moved along the control rail 115, the control clips SK need not necessarily be transferred from their closed or clamping position into their open or releasing position. In the region of the second section T2, the control clips SK can also remain in their closed position. Keeping the control clips closed even over the second section T2 may be advantageous, for example, when relatively thick films are to be produced and/or stretched, i.e. in particular when the films are to be relaxed. This applies in particular to thick PET films, for which it has proven particularly advantageous for the control clips to also remain in their closed or clamping position like the guide clips. This is shown in a view in FIG. 9a, which is similar to FIG. 9 and in which the aforementioned control clips SK are moved onto the control rail 115, which is spaced apart from the guide rail 15, but are not opened, unlike in the embodiment according to FIG. 9. In other words, the film continues to be held by all clips even in said region of the second section T2, i.e. by both the guide clips FK and the control clips SK. Nonetheless, the distance between two successive guide clips FK is reduced, as is the distance between a guide clip and a control clip, and between a control clip and a subsequent guide clip. In addition, it is also possible in a variant of this kind for the blade flaps and a film-holding region to be identical in both the control clips and guide clips. It should be noted that this is merely one possible variant and is not necessarily mandatory.

The schematic plan view in FIG. 10 with some more parts omitted illustrates the kinematics resulting from the sequence of a connection member VG, a subsequent control member SG, another connection member VG thereafter, a subsequent guide member FG after that, another subsequent connection member VG, etc.

It can be seen that each chain link, for example in the form of the guide member FG, remains in its initial position, whereas the next but one chain link in the form of a control member SG remains in parallel with the guide rail 15 but at a greater lateral distance from the guide rail 15, a guide member FG of this kind and a control member SG of this kind each being connected by means of a connection member VG that has been obliquely deflected. This produces the "trapezoidal arrangement". In this re-gard, FIG. 10 shows the connecting lines L for the individual guide, control and connection members, and high-lights the adjustment pins 38 about which the connection members VG pivot relative to the guide members FG and control members SG.

These connecting lines or lines of action F thus each extend from one central pin 38 to the next central pin 38 passing through the centre of the anchoring bolts 37, the individual clips being hinged or pivotally connected to the connection members VG as a result.

Since, as explained, the control clips SK also each comprise two rollers offset from one another in the circulating direction 4 (or additional roller pairs also offset in the vertical direction), the control clips SK are always oriented in parallel with the guide clips FK over the at least one second section T2, since the guide clips FK also roll on the guide rail surfaces by means of offset rollers, and the guide rail 15 and control rail 115 and the associated guide rail surfaces and control rail surfaces extend in parallel with one another or at least approximately in parallel with one another, with the exception of the upward or downward ramp.

In the following, the further configuration of the invention, the force correlations and the support of the clip conveyor units KT on the guide rail 15 will be described on the basis of FIGS. 11a and 11b.

It is also clear from the above descriptions that the arrangement of the casters extends preferably symmetrically with the inner chain link 35, i.e. preferably symmetrically with the sleeve 35 or, where provided, the small roller 36 or the bolt 37 passing through the two respective connection lugs 33 or 33a (see also FIGS. 5 to 7b). In this respect, FIG. 11a shows a central plane of symmetry or chain plane of symmetry KSE arranged so as to extend centrally between each upper and lower caster pair 27 of the guide member FG or guide clips FK, i.e. ultimately in parallel with the plane of the film F.

By means of a symmetrical arrangement of this kind in relation to the inner chain links, the high forces that occur during the relaxation in the machine direction can thus be distributed as uniformly as possible to the casters 27, 31, i.e. to the guide rollers 27 and the control rollers 31. As a result, the service life of these casters can be maximised.

Figure 11A:
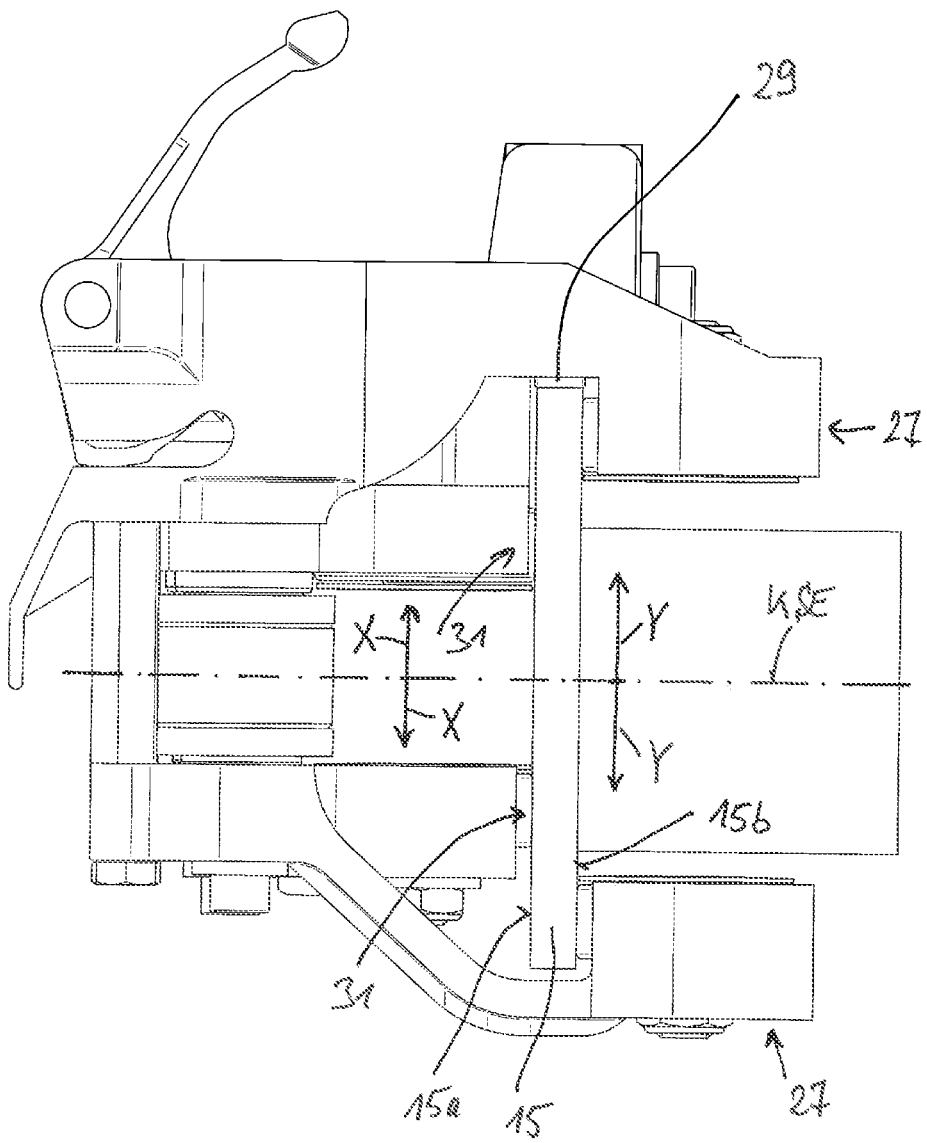
FIG. 11a is a schematic side view in a vertical section through the guide rail to illustrate the forces acting on the control clip.
Figure 11B:
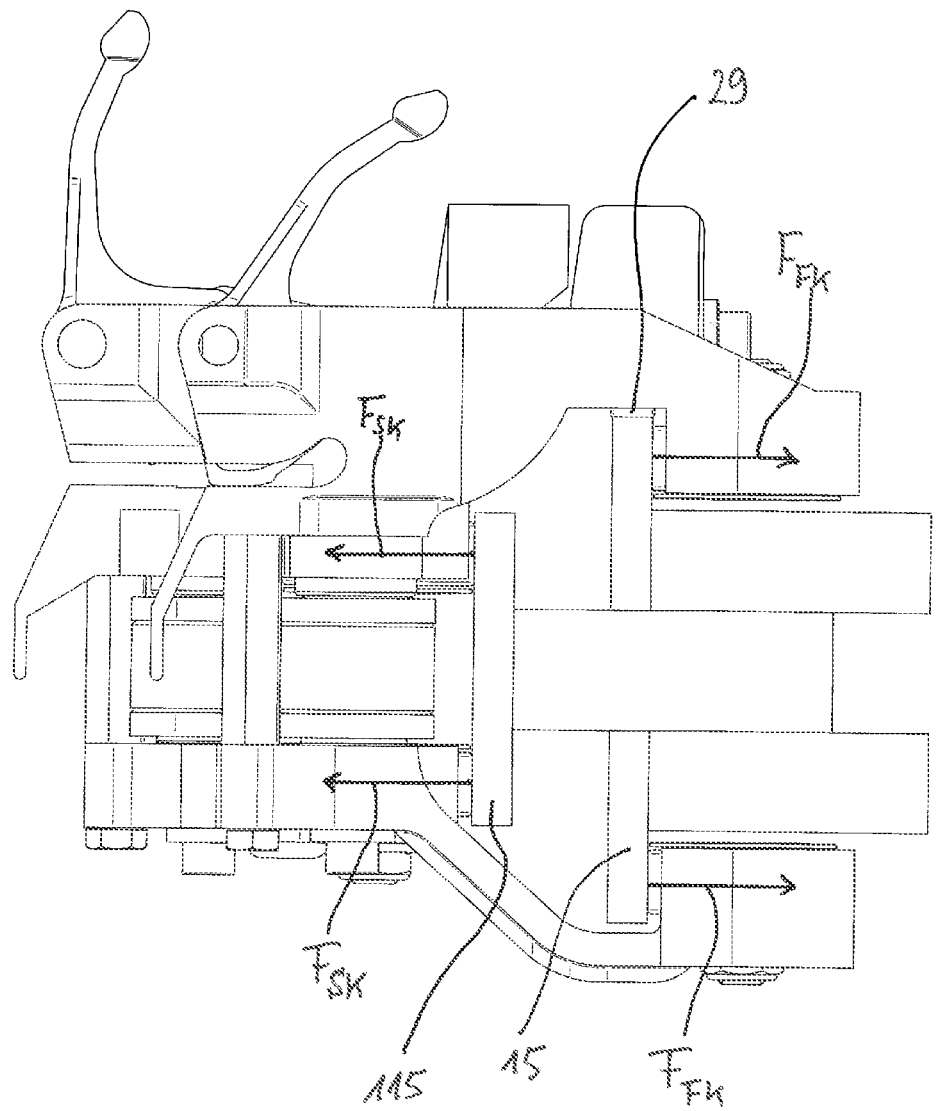
FIG. 11b is a view corresponding to FIG. 11a showing when a corresponding control clip is driven onto a control rail spaced apart from the guide rail.

FIG. 11a shows the corresponding chain plane of symmetry KSE, which extends centrally through the pivot pin 38, i.e. through the centre of the bolt 37 or the sleeve 35 of the relevant chain link such that the upper control rollers 31 roll on the running surface 15a above the chain plane of symmetry KSE at the same distance X, which corresponds to the distance X at which the additional control rollers 31 provided below the chain plane of symmetry KSE are arranged.

The same applies to the distance Y at which, on one hand, the upper guide rollers 27 roll on the rear running surface 15b of the guide rail 15 above the chain plan of symmetry and, on the other hand, the additional guide rollers 27 arranged below the chain plane of symmetry KSE at the same distance Y roll on said surface.

In other words, the aforementioned casters 27, 31 should be arranged such that they can withstand the forces produced when the control member SG is deflected when the associated control rollers run onto the control rail 115. When the control member SG is deflected towards the film (i.e. when the control rollers 31 run onto the control rail surface 115a of the control rail 115, as shown for example by FIGS. 9 and 10), the control rollers 31 are loaded towards the film. In the view according to FIG. 11b, the forces acting on the guide rollers 27 of the guide member FG and thus on the guide clips FK are shown as $F_{FK}$, the forces acting on the control rollers 31 in the opposite direction being marked as $F_{SK}$ in FIG. 11b.

The control rollers 31 can be fastened, for example, to the control member SG when a continuous conveyor chain 3a is used, as explained on the basis of FIGS. 7a and 7b. However, the control rollers 31 can also be fastened and anchored to the control clip SK itself, as shown for example in the schematic view from the rear according to FIG. 6. The forces acting on the casters, produced when the aforementioned control members are deflected, are the same level for both the control members and guide members. In the process, these forces are dependent on the total tensile forces introduced into the conveyor system 3 and the relaxation values in the machine direction.

For optimum force distribution, the control members SG and guide members FG should have the same number of control casters and guide casters (for the same load rating). A lower number could be compensated for by a higher load rating. This would mean that a larger diameter would need to be used (e.g. 1.5x to 2x as large), and specifically while widening the casters at the same time. This would not require a greater amount of space in the gap direction (the diameter would be doubled, but would be multiplied by half the number). However, an embodiment of this kind would have a negative effect on the construction depth and height of the system as a whole. As a result, the clips themselves would also become larger or take up more space in the depth direction, i.e. need more space overall. In addition, the surface pressure on the outer ring with respect to the roller rail would decrease but only disproportionately with relatively small curvatures.

Since the control member SG remains approximately parallel to the guide member during the deflection (neither the guide members nor the control members are pivoted about an axis in parallel with the running surfaces 15a, 15b), the spatial conditions for the control and guide members are the same, in order to provide the associated track wheels at the corresponding points.

Since the aforementioned casters 27, 31 are fastened only to the control members SG and guide members FG, and the connection members VG themselves do not have any track wheels, the space taken up by the connection members VG can be shared.

In the context of a preferred embodiment, therefore, the number of control rollers 31, of which the position can be altered together with the control members SG by means of the control rail 115, compared to the number of guide rollers 27, of which the position relative to the guide rail cannot be altered in the transverse direction, on the guide members FG produces a ratio of 4:4, or a ratio of 1:1.

Figure 12:
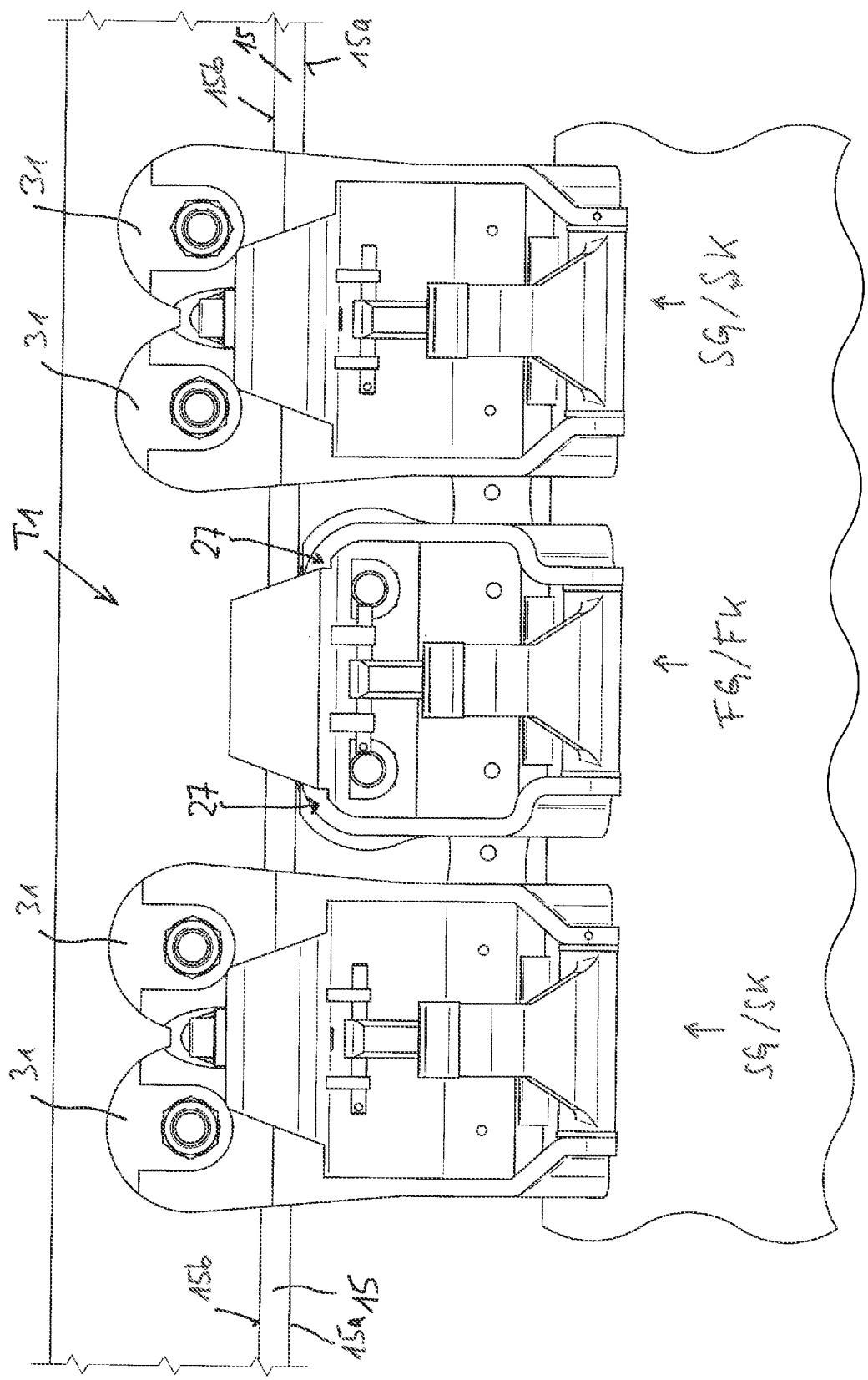
FIG. 12 shows a modified embodiment in which the guide clips and the control clips have the opposite actions compared with the previous embodiment.

By way of deviation from the previous embodiment, i.e. in particular by way of deviation from FIG. 9, the schematic plan view according to FIG. 12 shows that the control rail 115 and its film-side control rail surface 115a need not necessarily be arranged on the film side, i.e. closer to the film than the guide rail 15 or the film-side or clamping-side guide rail surface 15a thereof.

The variant according to FIG. 12 shows that a corresponding control rail 115 is provided on the side of the guide rail 15 facing away from the film side or clamping side. In this case, the functional construction of the guide members FG and the associated guide clips FK and control members SG, also in the form of the control clips SK, can fulfil the opposite function and take on the opposite design.

In the modified embodiment according to FIG. 12, in which the position of the guide rail 15 and control rail 115 is exactly the opposite to the previous embodiment, the construction and function of the clip conveyor units KT in the form of the guide clip FK and control clip SK is practically the opposite compared with the previous embodiments.

The corresponding relationships will be described below on the basis of the aforementioned FIG. 12 and FIG. 13.

In this respect, FIG. 12 shows the view of the guide clips FK and the control clips SK over the at least one first section T1, which is thus designed without a control rail 115. In this case, therefore, the guide rollers 27 of the guide member FG, and thus the guide clip FK, roll on the film-side or clamping-side running surface 15a of the guide rail 15, in line with the embodiment and arrangement shown in FIG. 12, whereas the control rollers 31 roll on the rear running surface 15b of the guide rail 15. If a control rail 115 having a rear control rail surface 115b at a distance from the rear guide rail surface 15b were to rise up out of the rear running surface 15b of the guide rail 15, the control member SG formed in this manner or the control clip SK formed in this manner would then be moved away from the film in the rearward direction R (see FIG. 13) in the opposite direction to the previous embodiment, as shown on the basis of the plan view according to FIG. 13.

Figure 13:
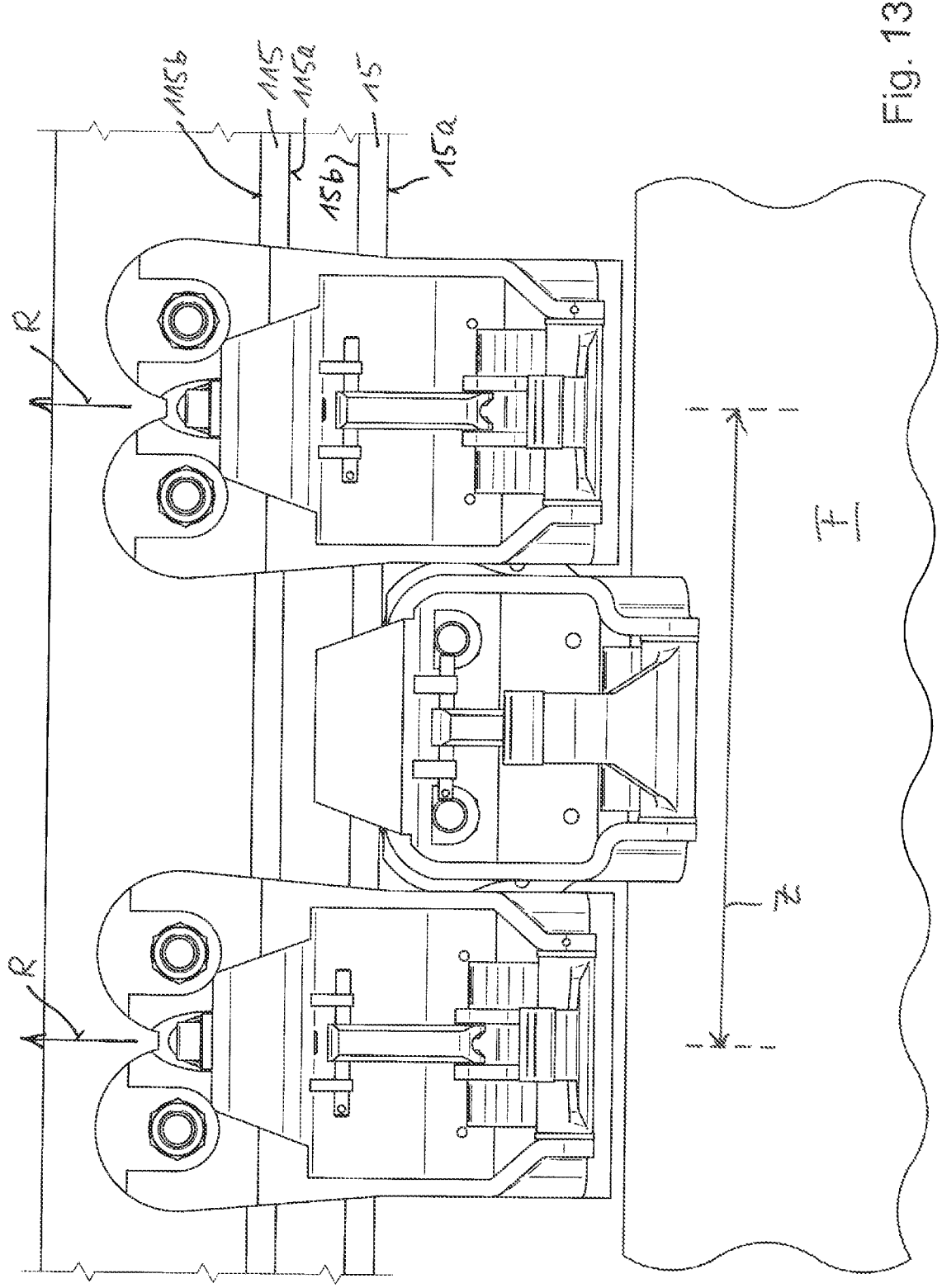
FIG. 13 is a view corresponding to FIG. 12, although in this view the guide clips are now moved on the guide rail and the control clips are now moved on the control rail in a supported manner, the control rail preferably extending on the guide rail side facing away from the film, preferably in parallel with said guide rail, unlike in the previous embodiments.

In the variant according to FIGS. 12 and 13, therefore, the basic construction of the guide clip FK corresponds to a construction as described in the previous embodiment where the guide rail and control rail are arranged in the opposite manner in relation to the control clip SK. Likewise, in the variant according to FIGS. 12 and 13, in which the guide rail 15 and control rail 115 are arranged in the opposite manner, the construction of the control clip SK basically corresponds to the construction as described on the basis of the guide clip FK in the previous embodiment.

In a variant of this kind, the weight roller 29 would preferably also be housed in the guide member FG, i.e. the guide clip FK, in order to support and carry the conveyor arrangement or conveyor chain on the guide rail. This is because the control members SG, which are displaceable transversely to the guide rail, are preferably not equipped with a weight roller 29 of this kind. However, since the control clips SK extend beyond the guide rails 15 in the variant according to FIGS. 12 and 13, it may also be favourable in terms of weight compensation for said control clips to be equipped with one or more weight rollers 29 either at least in addition to the guide clips FK or alone as an alternative to the guide clips FK.

Fundamentally, it should be noted at this juncture that one or more weight rollers 29 may only be provided on the guide members FG or guide clips FK or, alternatively, only on the control members SG or control clips SK. Ultimately, however, it is also possible for one or more weight rollers 29 to be provided on both the guide members FG or guide clips FK and the control members SG or control clips SK.

In principle, the film can be relaxed at all circulating position sections of the stretching system by moving the aforementioned control member SG transversely, i.e. in particular wherever a control rail can be provided in addition to the guide rail 15.

Advantageously, the film should be relaxed from the start of a further heating zone up to the discharge.

Relaxation of this kind carried out in the machine direction can be implemented separately from an optional transverse direction relaxation, i.e. an optional relaxation extending in the transverse direction with respect to the take-off direction 1, which, as known from the prior art, can be brought about by reducing, by a desired amount, the distance between the two guide rails 15 extending to the side of the film.

In the context of the invention, the film can be relaxed, for example, by between 1% and 10% (as shown at the bottom right in FIG. 17). This relaxation can be adjusted as necessary. The amount of relaxation, i.e. the distance D between two successive guide members FG for example, is shown by way of example in FIGS. 8 and 9.

If, for example, a gap Z of approximately 240 mm is assumed, since this gap or distance between two successive guide members FG corresponds to a relaxation of 0% (i.e. if the control member S between two successive guide members rolls together on the guide rail and the associated connection members FG are at their maximum longitudinal extension), the following gaps Z are produced, for example, for relaxations between 0% and 10% according to the following table:

| Relaxation [%] | Gap Z [mm] |
| --- | --- |
| 0 | 240 |
| 1 | 237.6 |
| 2 | 235.2 |
| 3 | 232.8 |
| 4 | 230.4 |
| 5 | 228 |
| 6 | 225.6 |
| 7 | 223.2 |
| 8 | 220.8 |
| 9 | 218.4 |
| 10 | 216 |

Opening the Blade Flaps Prior to Relaxation in the Machine Direction

As mentioned, gripping or clamping apparatuses 22 are provided on the guide clips FK and control clips SK in the form of the aforementioned clip levers or blade flaps 25a, which grip around the film edge in order to move the film through the system. When the film is stretched, the free length between the clip levers or blade flaps 25a should be small enough for the film to be held over the entire edge length as much as possible, and so for the forces due to the stretching to be introduced into the film as uniformly as possible. This is depicted schematically on the basis of FIG. 14a, in which the film edge F1 is also shown in addition to the film F. At one film edge F1 shown in FIG. 14, a clip lever or blade flap 25a, which belong to a guide member FG/guide clip FK, are shown, followed by a clip lever 25a provided on a control member SG/control clip SK, on which a clip lever 25a belonging to a subsequent guide clip FK is shown in turn.

Between each successive clip conveyor unit KT, a small indentation 43 is produced since the film attempts to contract counter to the stretching and holding forces due to the inherent forces $F_F$ in the film.

In this respect, the indentations 43 of the film F between the clips and clip levers 25a should be as small as possible since this affects the size of the edge strip. This is because the edge strip is characterised by a non-uniform or even irregular stretching of the film. This edge strip must ultimately be cut off as scraps and preferably recy-cled.

To thus prevent the film F being adversely affected by the gripped regions at the film edge F1 during relaxation, every other or every nth blade flap 25a is preferably opened prior to the relaxation.

By contrast to FIG. 14a, FIG. 14b shows the situation where the clamping device 22 of the control clips SK has been opened, and so the film edge F1 is only held by the guide clips FK. Although the distance between two successive guide clips FK is made smaller by this measure (as can also be seen by comparing FIGS. 14a and 14b), the indentation 43 on the film edge F1, formed between the two clamping devices 22 of two adjacent guide clips FK, is made considerably larger at the same time.

If the position of the control members SG and thus of the control clips SK is altered when they run onto the control rail 115 towards the film (as shown on the basis of the embodiments according to FIGS. 1 to 11b), the associated blade flap 25a of the clamping device 22 can also be opened only once the relaxation has begun, i.e. only once the position of the relevant control clip SK has changed in the transverse direction with respect to the guide clips FK. This is because moving the control clip and thus the associated blade flap towards the film relieves the transverse film forces in the blade flap 25a before the opening, the forces being transmitted to the unopened blade flaps more slowly than when opening takes place under full load.

If, as explained on the basis of FIGS. 12 and 13, the control member SG and thus the control clip SK is moved and adjusted away from the film to reduce the distance between the guide members FG, it is advisable to, where possible, open the blade flaps 25a on said control flaps at the latest when the control members are moving, or at least shortly before this movement begins in the transverse direction with respect to the guide rail and thus in the transverse direction away from the guide clips.

It is therefore clear from this explanation that in order to reduce the distance between two successive guide members FG or guide clips FK, the blade flaps 25a positioned on said members or clips should (or must) be opened, whereas the blade flaps 25a on the guide members FG or guide clips FK remain closed.

Figure 15:
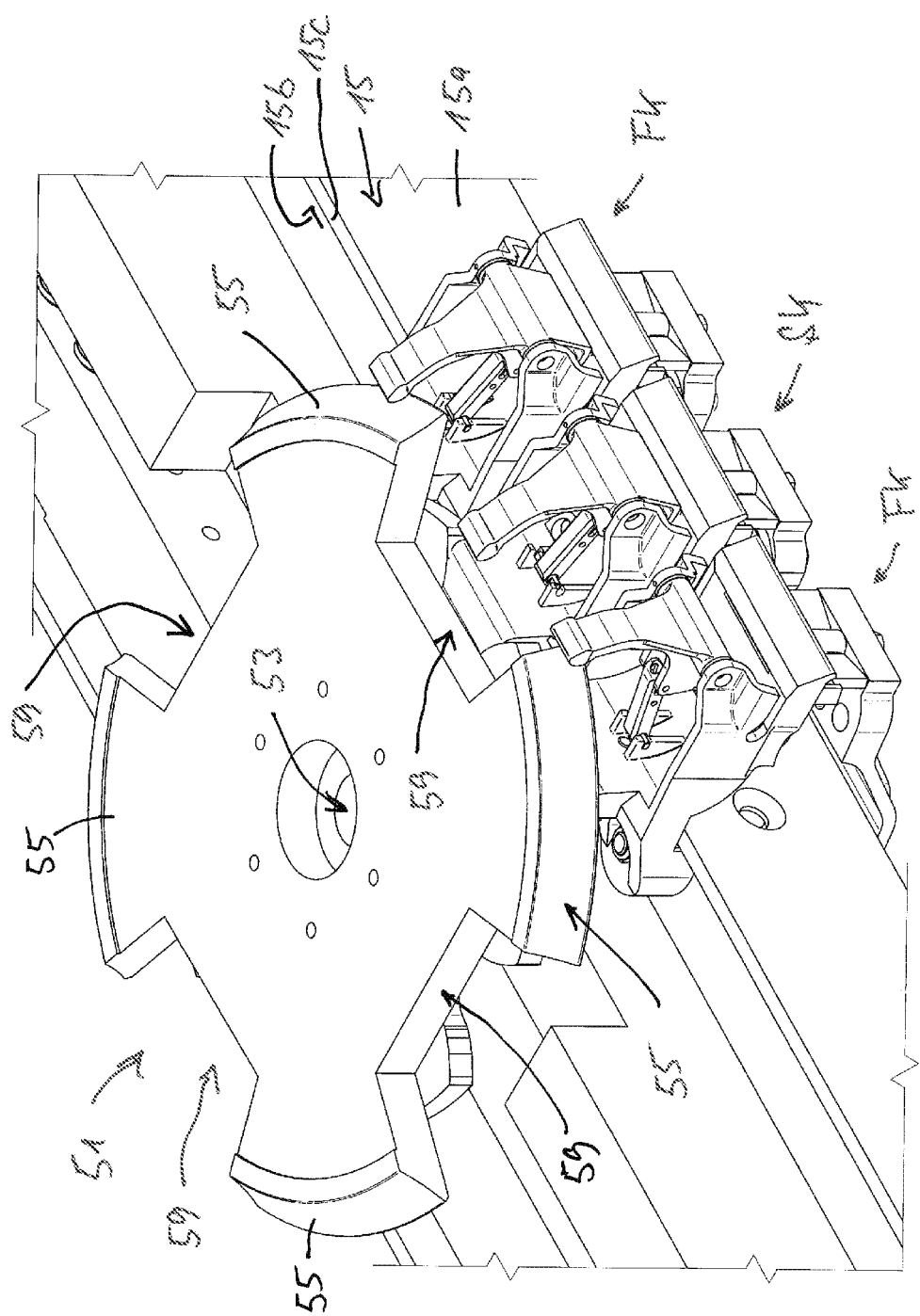
FIG. 15 is a spatial cut-out view of an opener wheel.

This can be done, for example, by means of an opener wheel 51, which is shown in a cut-out view in FIGS. 15 and 16 and is oriented in parallel with the running surfaces 15a, 15b of the guide rail 15 and/or in parallel with the control rail surface 115a of the control rail 115 about a wheel axis 53. Said opener wheel 51 comprises a gear rim 54 having radially protruding opener flanks 55, which extend only by a particular angle in the circulating direction, i.e. only by a particular opener flank width 57. A tooth recess 59 in the circumferential edge of the opener wheel 51 is formed between two thus formed opener flanks 55 offset in the circulating direction. As a result, when the rotary movement of the opener wheel 51 is adapted accordingly in terms of the clip conveyor elements KT passing by, it can be ensured that, for example, only every other clip lever on a clip conveyor unit is opened, and specifically those clip levers or blade flaps 25a arranged on the control members SG and thus on the control clips SK. The blade flaps provided on the guide members FG and thus on the guide clips FK remain closed, for example.

Alternatively, the corresponding blade flaps on the control members SG could also be opened, for example, using magnetic force by applying either a magnetic opener wheel or magnets to the desired opening position. Since only every other blade flap is opened (i.e. only those on the control members SG), for this to happen the blade flaps must be made of non-magnetic and magnetic material to ensure they react differently to the magnetic force.

Another alternative would be a different blade flap lever position or blade flap lever length. This would make it possible to open the longer blade flaps on the control members SG (said flaps protruding beyond the blade flaps 25a on the guide members FG, which end at a lower height) by means of an opening rail if, for example, the protruding ends of the blade flaps 25a strike the opening rail or are opened more gently by means of magnetic force.

Another alternative, for example, would be for the opener wheel 51 to be formed such that the opener flanks 55 only reach and therefore only open the blade flaps 25a to be opened. The unreachable opener flaps would then remain closed.

If an opening movement of this kind is carried out, the film edge is then only held on the guide clips FK by means of the blade flaps, and so a slightly larger indentation 43' is produced at the film edge F1, as shown in dashed lines in FIG. 14, although in this case account would also need to be taken of the fact that the distance between two successive blade flaps still holding the film edge F1 would be reduced by the resultant distance reduction.

With reference to FIG. 17, the schematic plan view shows a transverse stretching system in which the position of a relaxation opener wheel 51 is illustrated by a solid line, and the two alternative positions P1 and P2 of a relaxation opener wheel are shown in dashed lines. At the end of the stretching system, a clip opener wheel is shown at position P3; said wheel also opens the blade flaps that have re-mained closed up to this point on the guide clips FK in order to transfer the stretched film to a take-off device and then to a winding station, for example.

The position of the opener wheel 51 prior to or at the start of the relaxation in the machine direction can thus be variably adapted to the desired relaxation profiles in the machine direction.

If, for example, the gap between the blade flaps is 120 mm and the blade flap width is 60 mm, this produces a free length of 50%. If every second blade flap is opened, this produces a free length of 75% during the machine direction relaxation, i.e. relaxation in the machine direction. The ratio between the two free lengths becomes greater and greater the wider the blade flap.

Settings Options for the Control Rails

There are various settings options for the machine direction relaxation and optimum conveyor system or chain tension by reducing the overall length of the conveyor system or conveyor chain.

To ensure a particular set machine direction relaxation, a corresponding rail contour can be determined during production. For example, the control rail in the longitudinal relaxation region (machine direction relaxation region) in the running length could possibly be made of fragmented, solid, preferably single-piece components, the contours of which define the control rail surface 115a (or 115b) for the control rollers 31. The corresponding shape and dimensions (distance between the control rail surface 115a or 115b and the associated running surface 15a or 15b of the guide rail) result in a set, non-adjustable machine direction relaxation. Optionally, a control rail contour set in this manner could be extended by the guide rail and replaced by another control rail having a different length and/or dimensions, in order to achieve different relaxation values in the machine direction.

However, it is also possible to have a semi-flexible machine direction relaxation profile in which the control rail is produced in a layered manner from a plurality of rails or belts. In some portions, these could be swapped in order to make the distance flexible between the running surfaces of the guide rail and the running surfaces of the control rail.

By contrast, a semi-flexible machine direction relaxation system would also be possible if, for example, a corresponding control rail were screwed to, placed on or otherwise connected to a guide rail. This would be advantageous since adjusting the machine direction relaxation would only require exchanging the control rail.

A basic construction and transition, in the form of a ramp, from a guide rail to a control rail is shown, for example, in the schematic cross section on the basis of FIG. 18. In this case, a spacing wedge 65 is used between the guide rail and the control rail, a cover strip 66 being used between two step-like shoulders 68, 70 in the guide rail surface 15a and control rail surface 115a, such that a step-free transition from the guide rail surface to the control rail surface is possible.

The cross-sectional view in FIG. 19a schematically shows a control rail 115 rigidly fitted to a guide rail 15. In this variant according to FIG. 19a, the guide rail 15 is fastened to the guide rail 15 by means of a control rail support ST, the guide rail 15 in turn being mounted on a support or a support device T. In the process, the guide rail 115 and/or its control rail support ST can, for example, be attached to the guide rail 15 or directly to a support T in a wide variety of ways, e.g. screwed thereto, placed thereon, attached by clamps, etc. Optionally, a different distance between the guide rail 15 and the control rail 115 is also possible by exchanging the guide rail support or by means of different settings.

By contrast with FIG. 19a, FIG. 19b shows a variant in which the control rail 115 and its associated control rail support ST are held, preferably movably, on the guide rail 15 and/or its associated guide rail support FT by means of an insertion mechanism.

In the variant according to FIG. 19b, therefore, the control rail 115 can be mounted and anchored, and preferably exchanged or moved, independently and in a variable manner with respect to the guide rail 15, and specifically following the double arrow 63. In this case, the guide rail 15 is still used for supporting the weight and bearing the weight of the conveyor system. In addition, the aforementioned control rail 115 is provided, which preferably does not bear any of the conveyor system weight but could still do so by means of additional weight rollers that may be provided. As explained, in this process the distance between the clip conveyor units KT is reduced by a part of the conveyor system (the conveyor chain) being deflected so that individual conveyor members, such as the control members SG, are no longer collinear and the distance between the individual clip conveyor units KT and thus the overall length of the conveyor system is reduced in the machine direction.

Figure 20A:
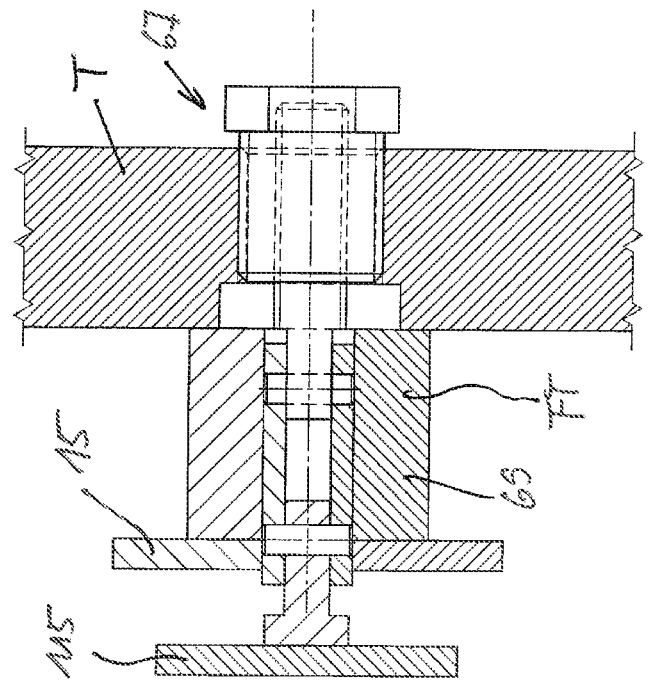
FIG. 20a is a schematic cross-sectional view through a control rail, the position of which can be adjusted by means of a threaded member, the control rail being moved towards the guide rail.
Figure 20B:
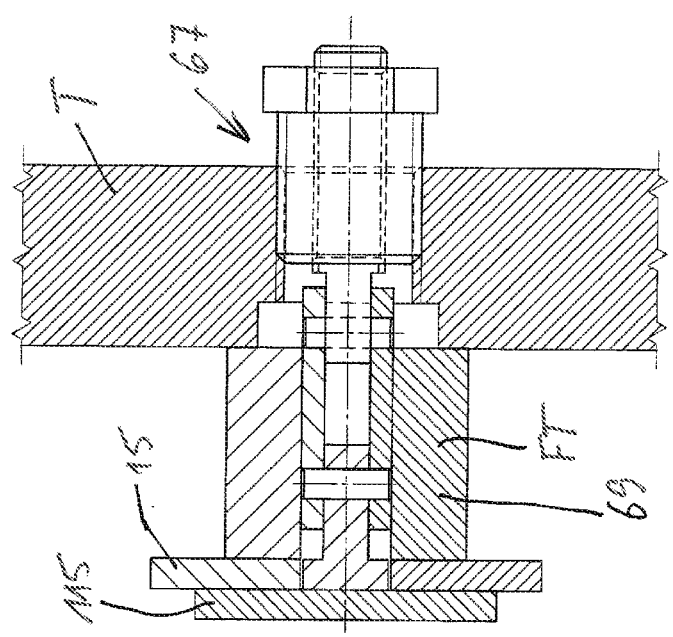
FIG. 20b is a cross-sectional view corresponding to FIG. 20a, although in this view the control rail is adjusted relative to the guide rail by means of the threaded member, thereby creating a spacing.

FIG. 20 is a schematic cross-sectional view showing the interaction by means of a screw device 67, which is connected for example to a holding element 69 supporting the control rail 115. The screw element 67 shown in FIG. 20 is connected to the holding element 69 in the advance and pulling direction, and so the screw element 67 can be screwed into or out of the support T by different amounts, the control rail 115 being moved away from the guide rail 15 or closer to the guide rail by different distances as a result, as becomes clear from comparing FIGS. 20a and 20b.

FIGS. 21a to 21d show a modified system—an adjustment mechanism 73 for a control rail.

In this variant too, the support T is connected to the rear of a guide rail 15 by means of support connection portions 72, as a result of which the guide rail 15 is held continuously or only in portions. A holding element 69 passes through the connection portions 72 and is axially displaceable therein; the adjustable control rail 115 is fastened to the protruding end of said element. The holding element 69 is axially displaceable within the corresponding recess 70 in the support connection portions 72 in order to move the control rail 115 back towards the guide rail or away therefrom.

The adjustment movement following the arrow 75 is carried out by means of a guide 77 (for example in the form of a guide bolt) that extends vertically in the embodiment shown and along which two base portions 79 can, for example, be moved towards or away from one another by mean of a motor. From these base portions 79 there protrudes a lever 81a and 81b, respectively, which extend towards the rails to form a common joint 83 that is in turn connected to the holding element 69 extending transversely with respect to the rails.

Figure 21A:
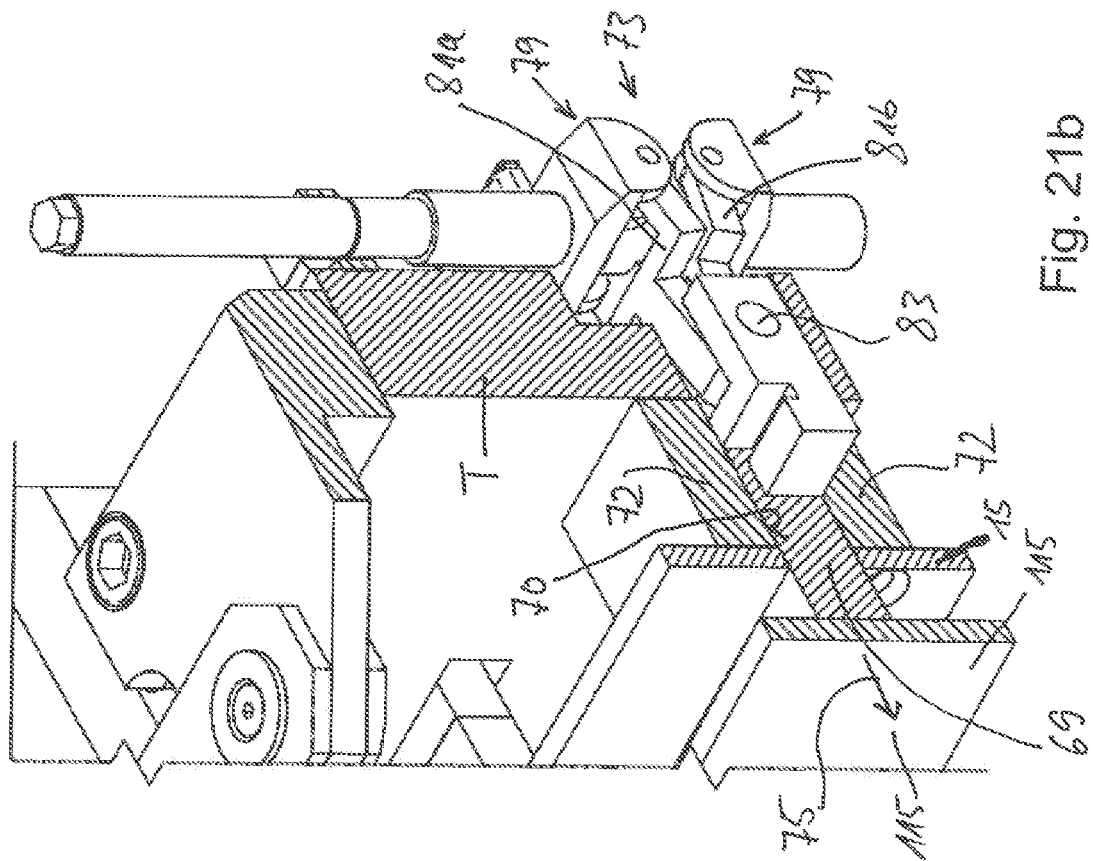
Figure 21B:
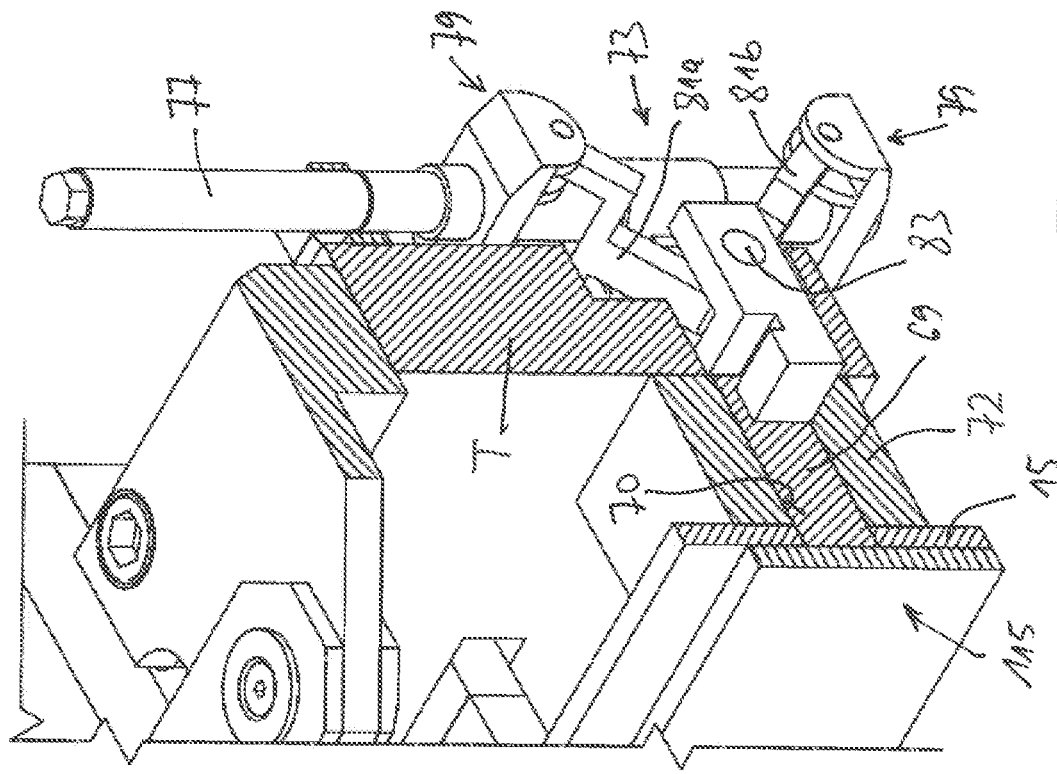

If the two base elements 79 are moved towards one another, the joint 83 moves towards the guide rail 15 and, in doing so, pushes the control rail 115 further away from the guide rail. If the two base portions 79 are moved away from one another along the guide 77, the control rail 115 is moved back towards the guide rail 15. In this respect, FIGS. 21a and 21c show the situation where the control rail 115 is moved towards the guide rail 15, whereas the views in FIGS. 21b and 21d show the situation where the control rail 115 has been adjusted to a position spaced apart from the guide rail 15. In the process, FIGS. 21c and 21d are views in a position rotated through 90° compared with FIGS. 21a and 21b.

Setting an Optimum Conveyor System Tension or Chain Tension

An optimum chain tension is achieved by "shortening" the chain; this is necessary (and accordingly advantageous) for fixed circulating geometries. By shortening the chain, the necessary chain tension is applied without having to adjust the circulating geometry (roller bar raceway) over the entire length. In particular with closed circulating geometries, there is no need for the special length compensation components. This chain tensioning apparatus is advantageous for rolling chain systems in which the guide tracks for the casters are continuous and so the length-adjustable components are very complex. In addition, this can minimise weak points in the circulating geometry (split guide track for casters; edge running). Furthermore, the two-part or threepart displaceable basic geometry, which has to meet very high rigidity requirements, can be designed as a single rigid basic construction.

Normally, the chain is tensioned by adjusting the length of the circulating geometry. The solution described here for shortening the chain is achieved by compelling the chain links to adopt a "zigzag" position instead of the stretched position (max. chain length set by the pull in the chain). In the above-described invention of a conveyor system having a machine direction relaxation function, part of the machine direction relaxation region can be used to increase the chain tensioning path. If the machine direction relaxation function is minimised, the chain can be closed in the shortest state. Even just moving the machine direction relaxation function to the operating position shortens the chain and thus builds tension. The chain is then shortened further by the actual tensioning apparatus.

In general, shortening the chain by means of a zigzag position requires the chain to be designed having casters arranged on either side of the guide rail. In addition, the casters must be positioned alternately to the left and right of the guide rail. As a result, widening the roller rail increases the distance between the casters, as a result of which the chain links are no longer collinear and thus shorten the chain. The roller rail can be widened by deflecting one part of a two-part (or multi-part) guide rail. The guide rail can be deflected either as described above or using a hydraulic cylinder. The aim is to achieve a constant chain tension. The chain tension is dependent on the cylinder force and the deflection angle of the chain links. Since the deflection of the chain links is adjusted depending on the length ratio of the chain to the guide track, the deflection angle is variable. Therefore, the cylinder force would need to be changed according to the deflection angle. In a specific arrangement of the cylinder, the cylinder force can be selected to be constant, regardless of the deflection position of the chain links.

From the above-described design of the stretching system and the associated elements, it is also clear
- that in the context of the invention, a longitudinal relaxation can be optimally set in desired regions, in particular in a discharge zone and a "relaxation zone", of a transverse stretching system, or in particular a transverse stretching stage of a sequential stretching system, by using the above-described guide clips, control clips and connection members, and/or
- alternatively or additionally, a desired tension can be adjusted or set in the conveyor system, and specifically regardless of whether the guide clips and control clips are connected to corresponding chain links of an endless chain, or whether no endless chain is used and the guide clips and control clips are merely interconnected by means of individual hinged connection elements.

Each embodiment is described using casters, i.e. guide rollers, control rollers and weight rollers. If required, however, sliding elements can also be used in general instead of the rollers. In other words, it is also possible to use sliding guide elements 27 in the guide clips FK instead of the guide rollers and to use sliding control elements 31 in the control clips SK instead of the control rollers. It is also possible to have mixed systems that operate in part using rollers and in part using sliding elements moved in a sliding manner on the corresponding slide surfaces on the guide rail and/or control rail.

Lastly, it should be noted that the stretching system according to the invention is characterised, inter alia, by the following possible additional features, specifically:

the guide clips (FK) comprise at least one upper pair and one lower pair of guide rollers (27) or sliding guide elements and/or the control clips (SK) comprise at least one upper pair and one lower pair of control rollers (31) or sliding control elements that are offset upwards and downwards from a chain plane of symmetry (KSE) passing through the centre of the chain link pins or bolts (37), preferably at the same distance from the chain plane of symmetry (KSE) or by a distance deviating by less than 10% therefrom, and/or the opening apparatus is designed such that the clip levers (25*a*) of each control clip (SK) or each nth control clip are opened, n being a natural number>1, and/or either at least one control clip (FK) or m control clips (FK) are arranged between two control clips (SK) that follow one another in the circulating direction (4), m being a natural number>1, and/or the distance setting or adjustment device (73) comprises a threaded device (67), and/or in the region of its recess, the rail support comprises a right-handed or left-handed thread into which a double-threaded bolt is screwed, the double-threaded bolt comprising a second thread in the form of a left-handed or right-handed internal thread, and in addition a left-handed thread bolt or a right-handed thread bolt being hinged to the control rail (115) such that the distance between the control rail (115) and the guide rail (15) can be adjusted when the double-threaded bolt is rotated.

The invention claimed is:

1. Stretching system comprising a transverse stretching system or a sequential stretching system comprising a longitudinal stretching stage and a transverse stretching stage, comprising:
    two circulating guide tracks arranged having a lateral offset transversely with respect to a take-off direction of a film to be stretched,
    a circulating conveyor system along the two guide tracks, the circulating conveyor system having a plurality of clip conveyor units, via which the film to be stretched can be gripped at its sides and moved through the transverse stretching system or transverse stretching stage from an infeed zone to a discharge zone,
    at least one circulating guide track of the two circulating guide tracks comprising a guide rail arrangement along which the clip conveyor units can be moved in a supported manner via casters and/or sliders,
    wherein:
    the clip conveyor units comprise guide clips and control clips, each of the guide clips and the control clips being separately provided with at least one clamping device via which device a film edge of the film to be stretched can be clamped in place,
    either at least two guide clips that follow one another in a circulating direction of the conveyor system are interconnected by arranging one of the control clips therebetween, or at least two successive control clips are interconnected by arranging one of the guide clips therebetween, such that a connector hinges together the one of the guide clips and an adjacent control clip, the adjacent control clip being adjacent to the one of the guide clips,
    over at least one first section, the guide rail arrangement comprises a guide rail having at least one associated guide rail surface, over at least one second section, the guide rail arrangement comprises, in addition to the guide rail, a control rail and/or a control rail surface that is arranged at a spacing from the guide rail or the at least one associated guide rail surface, the guide clips can be moved along the at least one first section and the at least one second section of the guide rail, for which purpose the guide clips are meshed with the guide rail or the at least one guide rail surface, and the control clips can be moved along the guide rail over the at least one first section and are meshed with the associated control rail or the associated control rail surface in the region of the at least one second section such that each of the control clips and each clamping device associated with each of the control clips is moved at a lateral offset from both the guide rail and the guide clips, such that, in the region of the at least one second section, the connector is pivoted, in the process reducing a distance between the one of the guide clips and the adjacent control clip.

2. Stretching system according to claim 1, wherein:

the at least one associated guide rail surface comprises a film-side guide rail surface on the film side, and the guide rail comprises a rear guide rail surface facing away from the film-side guide rail surface, the guide clips comprise guide rollers or guide sliders, the guide rollers or the guide sliders of the guide clips are meshed either at least with the rear guide rail surface or only with the rear guide rail surface, the control clips comprise control rollers or control sliders, and over the at least one second section, the control rollers or the control sliders of the control clips are meshed with a control rail surface facing the film or only with the control rail surface facing the film, and, over the first section, are meshed with the film-side guide rail surface or only with the film-side guide rail surface.

3. Stretching system according to claim 2, wherein at least the guide rollers and/or guide sliders of the guide clips are arranged such that at least one or more of the guide rollers and/or guide sliders are meshed with the guide rail surface facing the film being stretched and one or more of the guide rollers and/or guide sliders are meshed with the rear guide rail surface.

4. Stretching system according to claim 1, wherein:

the guide rail comprises a guide rail surface on the film side and a rear guide rail surface facing away therefrom, the guide clips comprise guide rollers or guide sliders, the guide rollers or the guide sliders of the guide clips are meshed either at least with the film-side guide rail surface or only with the film-side guide rail surface, the control clips comprise control rollers or control sliders, and over the at least one second section, the control rollers or the control sliders of the control clips are meshed with the rear control rail surface or only with the rear control guide surface, and, over the first section, are meshed with the rear guide rail surface or only with the rear guide rail surface.

5. Stretching system according to claim 1, wherein the conveyor system alternately comprises guide clips followed by control clips, each guide clip being hinged to a leading or trailing control clip via the connector having a chain link.

6. Stretching system according to claim 5, wherein the connector comprises two bolts, the two bolts comprising a leading bolt and a trailing bolt, one of the two bolts being anchored and held on the guide clip and the other of the bolts being anchored and held on the control clip such that the connector can be pivoted about a pivot pin passing centrally through the two bolts and relative to the guide clip and control clip.

7. Stretching system according to claim 1, wherein the conveyor system comprises a circulating conveyor chain comprising chain links, each four successive chain links consisting of a first chain link being a guide member, a second chain link being a connection member, a third chain link being a control member, and a fourth chain link being an additional connection member, the first chain link being the guide member being connected to a guide clip and each control member being connected to a control clip such that the first chain link being the guide member is hinged to the third chain link being the control member via the second chain link being the connection member.

8. Stretching system according to claim 1, wherein the conveyor system comprises a circulating conveyor chain comprising chain links comprising guide members, connection members, and control members, wherein all connection members and/or all guide members and/or all control members are identical.

9. Stretching system according to claim 1, wherein at least one guide clip of the guide clips comprises at least one weight roller or at least one weight slider, by which the at least one guide clip is supported and held with respect to the guide rail via an upward-facing guide surface of the at least one guide clip, and wherein at least one control clip of the control clips a) comprises at least one weight roller or at least one weight slider
or
b) is held via a guide clip that is adjacent to the at least one control clip without a weight roller or without a weight slider.

10. Stretching system according to claim 1, wherein, in the circulating direction, the guide clips comprise at least two offset guide rollers or guide sliders and/or, in the circulating direction, the control clips comprise at least two offset control rollers or control sliders.

11. Stretching system according to claim 1, wherein:

the guide clips comprise guide rollers or guide sliders, and the guide rollers or the guide sliders are held on either the guide clips or the guide members to which a guide clip is fastened, or the control rollers or the control sliders are held on either the control clips or the control members to which each control clip is fastened.

12. Stretching system according to claim 1, wherein:

the control rail or the control rail surface is arranged such that each control clip is moved in the transverse direction transversely with respect to the guide rail towards the film being stretched, or the control rail or the control rail surface is arranged such that each control clip is moved in the transverse direction transversely with respect to the guide rail away from the film being stretched.

13. Stretching system according to claim 1, wherein, in the region of the second section, each of the guide clips are provided with at least one guide clip clamping device via which device a film edge of the film to be stretched can be clamped in place, and each of the control clips are provided with at least one control clip clamping device via which device the film edge of the film to be stretched can be clamped in place, and a) both the guide clips and the control clips are in a closed or clamping position, or b) an opener is provided, via which only the at least one control clip clamping device is configured to be moved selectively from the closed or clamping position into an open or releasing position.

14. Stretching system according to claim 13, wherein:
the at least one guide clip clamping device comprises a guide clip lever that can be pivoted between the clamping position and an open position,
the at least one control clip clamping device comprises a control clip lever that can be pivoted between the clamping position and the open position,
the opener, which is provided within an oven arrangement through which the circulating conveyor track is guided, is configured to pivot the control clip lever from the clamping position into the releasing position.

15. Stretching system according to claim 14, wherein:
the control clip lever provided on the control clips comprises a magnetic material, wherein the opener is configured to selectively pivot the control clip lever from the clamping position into the releasing position contactlessly via magnetic action, or
the control clip lever is configured to selectively pivot from the clamping position into the releasing position via contact with a stopper.

16. Stretching system according to claim 15, wherein:
the opener comprises an opener wheel that rotates about a wheel axis and comprises a gear rim having opener flanks,
the opener wheel is formed, arranged and/or positioned in a region of the control rail or in a transition region from the guide rail to the control rail such that teeth or opener flanks of the gear rim mesh only with the control clip lever and pivot said control clip lever from the clamping position into the releasing position.

17. Stretching system according to claim 1, wherein either at least one control clip or p control clips are arranged between two guide clips that follow one another in the circulating direction, p being a natural number>1.

18. Stretching system according to claim 1, wherein:
the two circulating guide tracks each comprise a rail support,
the guide rail and the control rail comprise a shared rail body fastened to the rail support,
or
the guide rail is formed in one piece and the control rail is formed in one piece and the guide rail and the control rail are fastened to the rail support,
or
the guide rail and/or the control rail comprise a plurality of rail belts that are layered one on top of the other, fastened to one another and extend over a length,
or
the control rail is releasably placed on the guide rail,
or
a distance between the control rail and the guide rail can be adjusted by a distance setting or adjustment device without removing the guide rail.

19. Stretching system according to claim 18, wherein:
the control rail and the guide rail each comprise a main body;
the main body of the guide rail is fastened to the rail support;
the rail support and the main body of the guide rail comprise a recess through which the main body of the control rail can be accessed;
the distance setting or adjustment device is positioned in said recess and is connected to the main body of the control rail such that compressive and/or tensile forces can be transmitted to the main body of the control rail, as a result of which the distance between the control rail and the guide rail can be altered.

20. Stretching system according to claim 19, wherein:
the distance setting or adjustment device comprises a lifting spindle or a hydraulic cylinder that is arranged at least in part in the recess and is connected so as to alter the position of the control rail relative to the guide rail.

* * * * *